United States Patent
Farneman et al.

(10) Patent No.: US 8,382,957 B2
(45) Date of Patent: Feb. 26, 2013

(54) RECYCLING AND MATERIAL RECOVERY SYSTEM

(75) Inventors: John Otis Farneman, Powell, OH (US); Keith Leroy Welch, Lexington, OH (US)

(73) Assignee: Micro Recovery Solutions, LLC, Powell, OH (US)

( * ) Notice: Subject to any disclaimer, the term of this patent is extended or adjusted under 35 U.S.C. 154(b) by 900 days.

(21) Appl. No.: 11/955,830

(22) Filed: Dec. 13, 2007

(65) Prior Publication Data

US 2008/0141589 A1  Jun. 19, 2008

Related U.S. Application Data

(60) Provisional application No. 60/874,852, filed on Dec. 14, 2006.

(51) Int. Cl.
*C10B 1/00* (2006.01)
*B01J 19/08* (2006.01)

(52) U.S. Cl. ....... 202/84; 202/100; 202/105; 422/186.3; 219/690

(58) Field of Classification Search ............ 201/19, 201/25, 30; 202/83, 100, 105, 84; 422/186, 422/186.3; 219/690; 585/240–242; 204/157.15
See application file for complete search history.

(56) References Cited

U.S. PATENT DOCUMENTS

| | | | |
|---|---|---|---|
| 3,449,213 A | 6/1969 | Knapp et al. |
| 3,560,347 A | 2/1971 | Knapp et al. |
| 3,843,457 A | 10/1974 | Grannen et al. |
| 3,849,332 A | 11/1974 | Bailey et al. |
| 4,055,001 A | 10/1977 | Forster et al. |
| 4,065,361 A | 12/1977 | Hanson |
| 4,153,533 A | 5/1979 | Kirkbride |
| 4,252,487 A | 2/1981 | Jeppson |
| 4,282,066 A | 8/1981 | Wagener et al. |
| 4,319,856 A | 3/1982 | Jeppson |
| 4,376,034 A | 3/1983 | Wall |
| 4,412,841 A | 11/1983 | Du Broff et al. |

(Continued)

FOREIGN PATENT DOCUMENTS

| | | |
|---|---|---|
| DE | 4026800 A1 | 2/1991 |
| WO | 91/03281 A1 | 3/1991 |

(Continued)

OTHER PUBLICATIONS

Introducing the EnviroWave Process, www.envirowave.com/index. html, printed on Nov. 7, 2007, The Envirowave Corporation (2007), Fredericktown, OH, 1 page.

(Continued)

*Primary Examiner* — Nina Bhat
(74) *Attorney, Agent, or Firm* — Benjamen E. Kern

(57) ABSTRACT

A method of recovering an organic decomposition product from an organic source may include: a) causing an inert gas to flow through the reduction zone from a reduction inlet to a reduction outlet in such a way that pressure in the reduction zone is maintained above ambient pressure of a local environment for the material recovery system and b) applying electromagnetic wave energy to the organic source in the reduction zone via a bifurcated waveguide assembly in the substantial absence of oxygen to produce at least one gaseous organic decomposition product in the reduction zone that is exhausted from the reduction zone along with the inert gas through the reduction outlet. A material recovery system may include a housing with an inert gas inlet, a reduction zone, and a reduction outlet, an inert gas supply, an electromagnetic wave generator, a bifurcated waveguide assembly, and a controller.

34 Claims, 20 Drawing Sheets

U.S. PATENT DOCUMENTS

| | | | |
|---|---|---|---|
| 4,567,340 A | | 1/1986 | Latchum, Jr. |
| 4,592,291 A | | 6/1986 | Sullivan, III |
| 4,759,300 A | * | 7/1988 | Hansen et al. ............... 110/229 |
| 4,776,936 A | | 10/1988 | Smith et al. |
| 4,839,151 A | | 6/1989 | Apffel |
| 5,084,140 A | | 1/1992 | Holland |
| 5,084,141 A | | 1/1992 | Holland |
| 5,105,563 A | | 4/1992 | Fingerson et al. |
| 5,152,074 A | | 10/1992 | Kishi |
| 5,237,755 A | | 8/1993 | Lowe |
| 5,304,962 A | | 4/1994 | Bobadilla et al. |
| 5,330,623 A | | 7/1994 | Holland |
| 5,366,595 A | * | 11/1994 | Padgett et al. ............... 201/19 |
| 5,373,646 A | | 12/1994 | Wosnitza et al. |
| 5,387,321 A | * | 2/1995 | Holland ............... 202/99 |
| 5,507,927 A | | 4/1996 | Emery |
| 5,536,477 A | | 7/1996 | Cha et al. |
| 5,634,281 A | | 6/1997 | Nugent |
| 5,864,964 A | | 2/1999 | Barragan |
| 5,877,395 A | | 3/1999 | Emery |
| 5,899,630 A | | 5/1999 | Brock |
| 5,950,325 A | | 9/1999 | Mehdizadeh et al. |
| 5,974,687 A | | 11/1999 | Gante et al. |
| 6,008,750 A | | 12/1999 | Cottle et al. |
| 6,133,500 A | * | 10/2000 | Emery ............... 422/186 |
| 6,152,306 A | | 11/2000 | Miller |
| 6,187,988 B1 | | 2/2001 | Cha |
| 6,233,841 B1 | | 5/2001 | Beach |
| 6,534,754 B2 | * | 3/2003 | Schulz et al. ............... 219/679 |
| 6,618,957 B2 | | 9/2003 | Novak et al. |
| 6,864,757 B2 | | 3/2005 | du Toit et al. |
| 7,028,623 B1 | | 4/2006 | Pearson |
| 7,101,464 B1 | * | 9/2006 | Pringle ............... 202/113 |
| 7,133,584 B2 | | 11/2006 | Dawes |
| 7,361,303 B2 | * | 4/2008 | Kantor et al. ............... 422/22 |
| 7,607,860 B2 | | 10/2009 | Novak |
| 7,629,497 B2 | * | 12/2009 | Pringle ............... 585/241 |
| 7,767,187 B2 | * | 8/2010 | Hong ............... 423/461 |
| 7,927,465 B2 | * | 4/2011 | Novak ............... 204/157.15 |
| 2002/0046474 A1 | | 4/2002 | Novak et al. |
| 2002/0090268 A1 | | 7/2002 | Haller |
| 2002/0150425 A1 | | 10/2002 | Bodish |
| 2003/0070912 A1 | | 4/2003 | Holzschuh et al. |
| 2007/0102279 A1 | | 5/2007 | Novak |
| 2007/0131591 A1 | | 6/2007 | Pringle |
| 2007/0135877 A1 | | 6/2007 | Pringle |
| 2008/0179177 A1 | | 7/2008 | Cha |
| 2008/0277388 A1 | | 11/2008 | Carr |
| 2011/0132902 A1 | | 6/2011 | Novak |
| 2011/0215092 A1 | | 9/2011 | Novak |

FOREIGN PATENT DOCUMENTS

| | | | |
|---|---|---|---|
| WO | WO 92/02598 | * | 2/1992 |
| WO | 93/14821 | | 8/1993 |
| WO | 01/03473 A1 | | 1/2001 |
| WO | 02/14764 A2 | | 2/2002 |

OTHER PUBLICATIONS

Drying and Treating Bio-solids with Microwaves, www.envirowave.com/biosolids.html, printed on Nov. 7, 2007, The Envirowave Corporation, Fredericktown, OH, 3 pages.

Remediation of PCB's and Other Organic Contaminants, www.envirowave.com/organics.htm, printed on Nov. 7, 2007, The Envirowave Corporation, Fredericktown, OH, 3 pages.

The EnviroWave Process and Waste Tire Reduction, www.envirowave.com/scraptirereduction.htm, printed on Nov. 7, 2007, The Envirowave Corporation, Fredericktown, OH, 3 pages.

About EnviroWave Corporation, www.envirowave.com/aboutenvirowave.htm, printed on Nov. 7, 2007, The Envirowave Corporation, Fredericktown, OH, 3 pages.

Frequently Asked Questions About the EnviroWave Microwave Process, www.envirowave.com/faq.htm, printed on Nov. 7, 2007, The Envirowave Corporation, Fredericktown, OH, 3 pages.

$25 Million Fraud Litigation Action Against Exxadon, Environmental Waste Management Corporation, http://findarticles.com/p/articles/mi_m0EIN/is_196_July_25/ai_18519643, printed Apr. 23, 2007, Business Wire (Jul. 25, 1996), 4 pages.

Brahic, Giant microwave turns plastic back to oil, http://environment.newscientist.com/article.ns?id=dn12141&print=true, printed Feb. 14, 2008, NewScientist Environment (Jun. 26, 2007), 2 pages.

New Scientist Magazine Features Global Resource Corp.'s Hawk 10 Emission-Free Recycling Machine, press release by Global Resource Corporation, West Berlin, NJ (Jun. 28, 2007), 2 pages.

Environmental Waste International Inc.—Complete Profile, http://strategisic.gc.ca/app/ccc/search/navigate.do?language=eng&portal=1&subPortal..., printed Apr. 23, 2007, Industry Canada, Ottawa, Ontario, Canada, 5 pages.

Microwave Reduction of Medical Waste and Tires, Ontario Centre for Environmental Technology Advancement (OCETA) Environmental Technology Profiles, Cat. #06-008 / 08-023 / 09-028, www.oceta.ca/profiles/ewi/ewi_tech.html, printed Apr. 23, 2007, OCETA, Mississauga, Ontario, Canada (Jul. 2000), 6 pages.

Molecular Waste Technologies, Inc. Introduces you to the 21st Century in Waste Disposal, www.molecularwastetech.com, printed Apr. 23, 2007, Molecular Waste Technologies, Inc., Marietta, GA (2006), 5 pages.

Int'l App. No. PCT/US07/87399, International Search Report, mailed May 7, 2008, 4 pages.

Int'l App. No. PCT/US07/87399, Written Opinion of the International Searching Authority, mailed May 7, 2008, 5 pages.

Complaint for Injunctive Relief and Damages, dated Aug. 13, 2010, in *Novak, et al.* v. *Farneman, et al.*, United States District Court for the Southern District of Ohio, Eastern Division, Case No. 2:10-cv-00768.

Defendants' [Farneman, et al.] Post-Hearing Brief in Opposition to Plaintiffs' [Novak, et al.] Motion for Preliminary Injunction, dated Oct. 22, 2010, in *Novak, et al.* v. *Farneman, et al.*, United States District Court for the Southern District of Ohio, Eastern Division, Case No. 2:10-cv-00768.

Opinion and Order Denying Plaintiffs' [Novak, et al.] Motion for Preliminary Injunction, dated Nov. 9, 2010, in *Novak, et al.* v. *Farneman, et al.*, United States District Court for the Southern District of Ohio, Eastern Division, Case No. 2:10-cv-00768.

Gaines et al., "Discarded Tires: Energy Conservation Through Alternative Uses." Argonne National Laboratory, ANL/CNSV-5, Dec. 1979, pp. 1, 16, 19, and 22.

Advanced Microwave Technology, "An energy storage device." www.amtmicrowave.com/resonant_cav.htm, printed Jan. 14, 2012, NSW 2500, Australia, 2 pages.

Bebb, "Chemistry of Rubber Processing and Disposal." Environmental Health Perspectives, vol. 17, pp. 95-102, Oct. 1976.

Waddell et al., "Pneumatic Tire Compounding." The Goodyear Tire & Rubber Company, pp. 596-611.

Rubber Manufacturers Association, "Pyrolysis." www.rma.org/scraptire.html, May 2002, 1 page.

Rubber Manufacturers Association, "Tire—Petroleum Energy Comparison." www.rma.org, 1 page.

Dodds et al., "Scrap Tires: A Resource and Technology Evaluation of Tire Pyrolysis and Other Selected Alternative Technologies." EG&G, EGG-2241, Nov. 1983, pp. 1, 4, 18-20.

CalRecovery, Inc., "Appendix Table D-4. Selected Compounds in Tire-Derived Oil." Environmental Factors of Waste Tire Pyrolysis, Final Report, Jul. 1995, p. D-4.

Zelibor et al., "Recycling Scrap Tires Into New Tires." Scrap Tire Management Council; Rubber Manufacturers Association, p. 1 and 4-6.

* cited by examiner

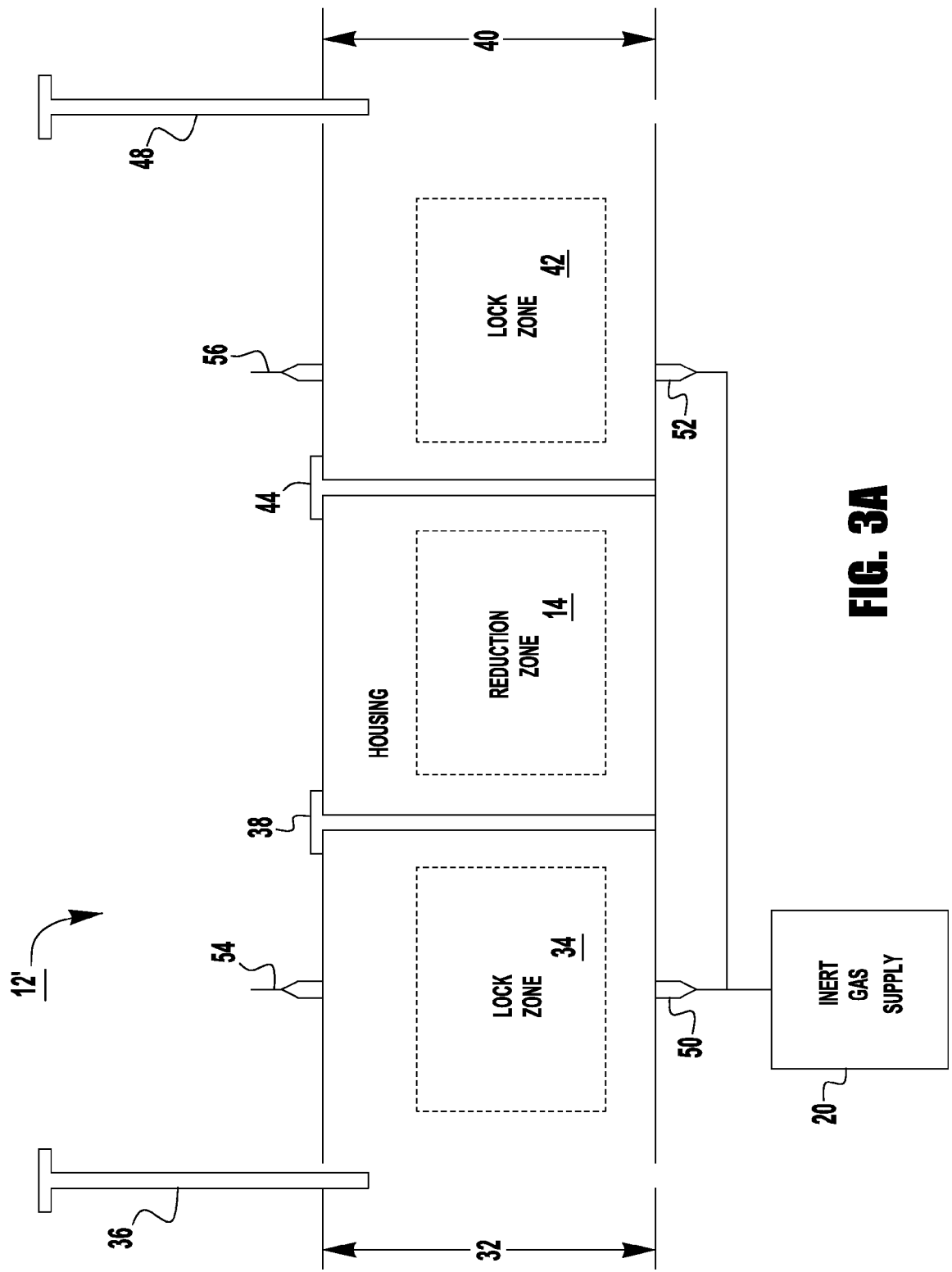

DISTILLING THE AT LEAST ONE FUEL GAS BY - PRODUCT INTO AT LEAST ONE OF METHANE GAS, ETHANE GAS, PROPANE GAS, BUTANE GAS, PENTANE GAS, HEXANE GAS, AND ANY CORRESONDING ISOMER GAS.

REDUCING A SOURCE SUBSTANCE INTO SMALLER PARTICLES USING AT LEAST ONE OF A GRINDING PROCESS, A CRUSHING PROCESS, AND A SHREDDING PROCESS.

354

SEPERATING THE SMALLER PARTICLES INTO AT LEAST FIRST AND SECOND PARTICLE TYPES.

356

PROVIDING THE FIRST PARTICLE TYPE AS THE ORGANIC SOURCE IN 302

RECYCLING AND MATERIAL RECOVERY SYSTEM

CROSS-REFERENCE TO RELATED APPLICATIONS

This application claims the benefit of U.S. Provisional Patent Application No. 60/874,852, filed Dec. 14, 2006, the contents of which are fully incorporated herein by reference.

BACKGROUND

Pyrolytic reduction may be defined as the result of thermal decomposition of organic compounds in a reduced oxygen atmosphere. When organic molecules are heated to high temperatures, carbon-carbon sigma bonds rupture and the molecules are broken into free-radical fragments. This fragmentation step, called thermally-induced homolysis—which is homolytic cleavage caused by heat—is the initiation step for a series of free-radical reactions.

Controlled pyrolysis has traditionally been used in the petrochemical industry to achieve cracking of high-molecular weight compounds. For example, cracking crude oil at refineries. Such thermal cracking has been replaced with catalytic cracking which uses externally-applied heat in the presence of a catalyst.

Typically, pyrolytic scrap tire reduction may involve: i) subjecting the material for reduction to high temperatures from an externally applied heat source which may consume considerable amounts of energy, ii) processing the products of reduction, such as melted rubber, oil and char, which may require special handling for safety and transportation, and iii) combustion of reduction products at high temperatures which may result in additional environmental issues.

For example, combustion of scrap tires directly in a cyclone furnace or rotary kiln may result in: i) production of high levels of particulates, dioxins, carbon monoxide (CO), nitrogen oxides ($NO_x$), sulfur oxides ($SO_x$), and heavy metal vapors, ii) complex treatment of emissions products of combustion which may require the use of selective catalytic combustion, precipitators, or baghouses to reduce emissions to levels allowable under Environmental Protection Agency (EPA) regulations, and iii) disposal of residual waste products such as char, ash, and steel.

SUMMARY

In one aspect, a method of recovering at least one organic decomposition product produced from an organic source in an essentially gas-tight reduction zone of a material recovery system is provided. In one embodiment, the method includes: a) causing an inert gas to flow through the reduction zone from a reduction inlet to a reduction outlet in such a way that pressure in the reduction zone is maintained above ambient pressure of a local environment for the material recovery system and b) applying electromagnetic wave energy to the organic source in the reduction zone via a bifurcated waveguide assembly in the substantial absence of oxygen to produce at least one gaseous organic decomposition product in the reduction zone that is exhausted from the reduction zone along with the inert gas through the reduction outlet.

In another aspect, a material recovery system is provided. In one embodiment, the material recovery system includes: a housing adapted to receive an organic source in a reduction zone, the housing including an inert gas inlet and a reduction outlet in operative communication with the reduction zone, an inert gas supply in operative communication with the inert gas inlet and adapted to purge the reduction zone and maintain a positive pressure therein, initial gaseous content of the reduction zone being exhausted via the reduction outlet during the purging and inert gas being exhausted via the reduction outlet during the maintaining of the positive pressure, an electromagnetic wave generator in operative communication with the housing and adapted to apply electromagnetic wave energy to the reduction zone via a bifurcated waveguide assembly to reduce the organic source in the reduction zone to at least one gaseous organic decomposition product, the at least one gaseous organic decomposition product being exhausted with the inert gas via the reduction outlet during the maintaining of the positive pressure, and a controller in operative communication with the electromagnetic wave generator and adapted to control application of the electromagnetic wave energy to the reduction zone.

DRAWINGS

These and other features, aspects, and advantages of the present invention will become better understood with regard to the accompanying drawings, following description, and appended claims.

FIG. 3A is a block diagram of another exemplary embodiment of a housing for the material recovery system of FIG. 1;

Figure 1:
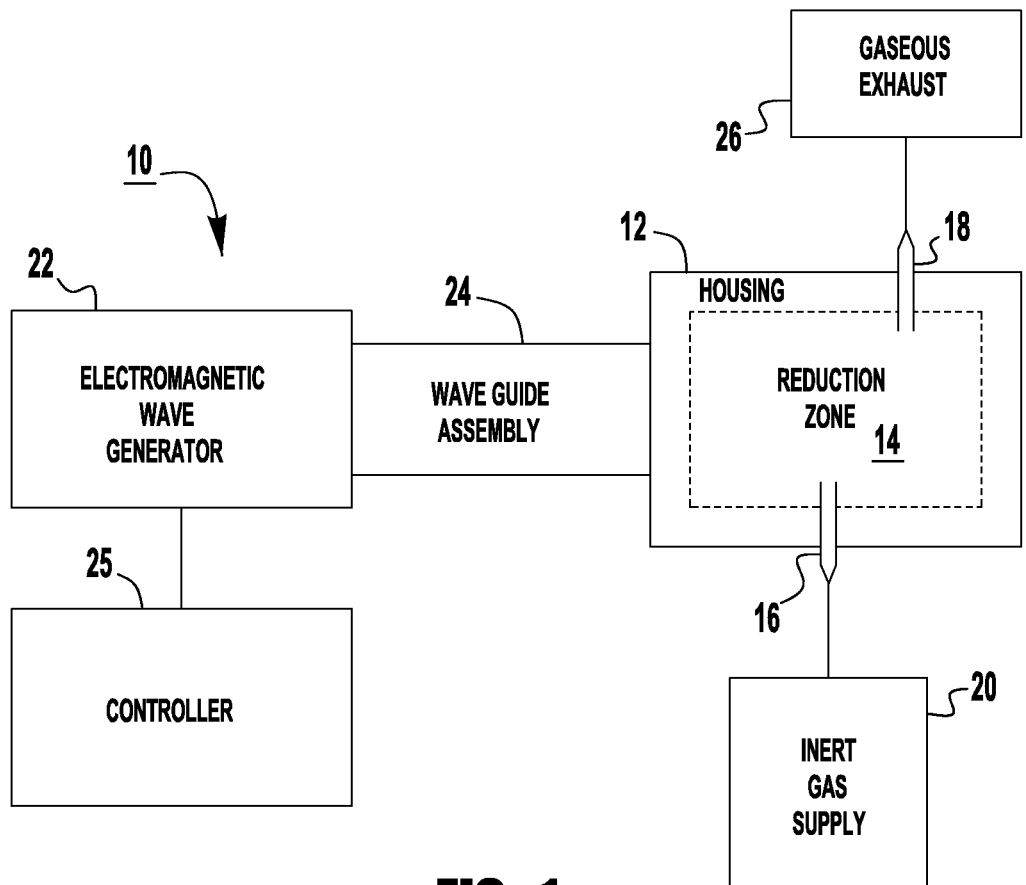
FIG. 1 is a block diagram of an exemplary embodiment of a material recovery system.
Figure 4:
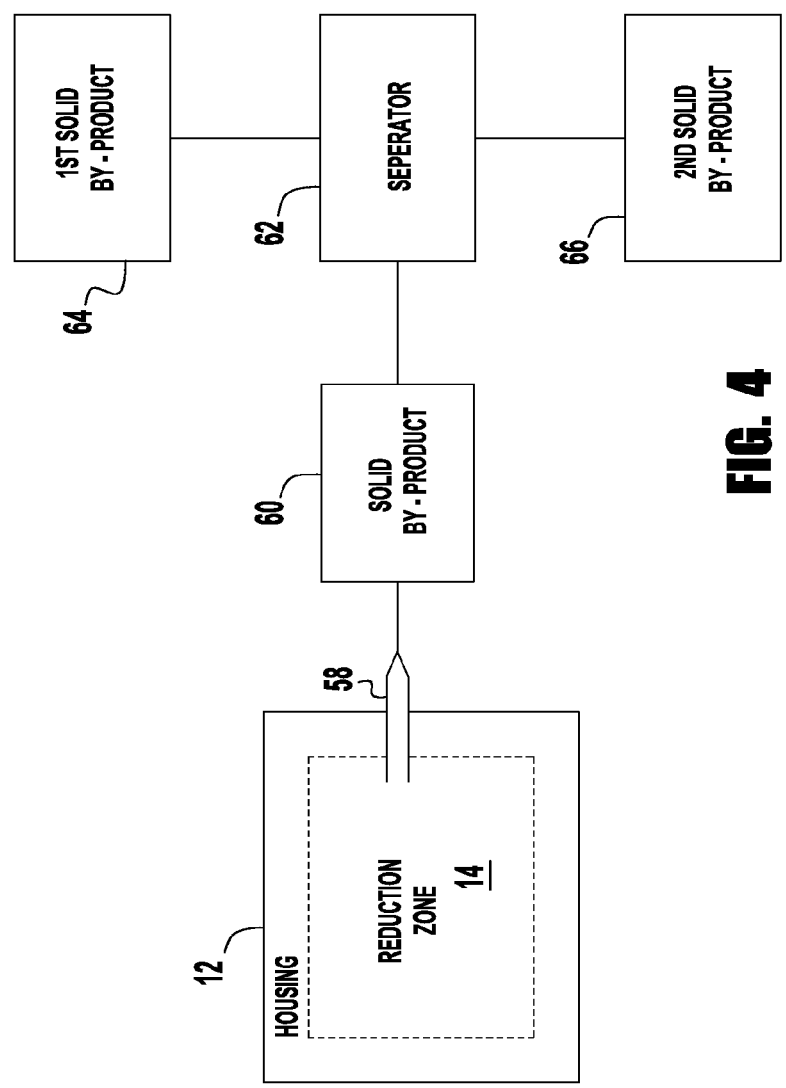
Figure 5:
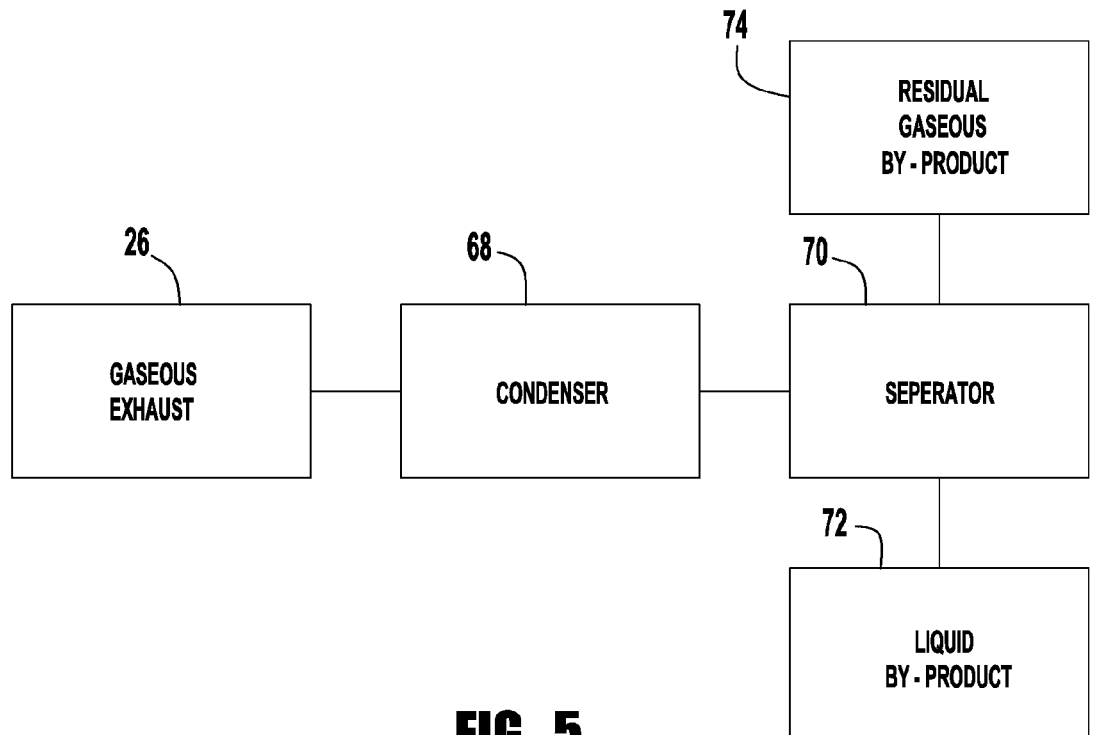
Figure 6:
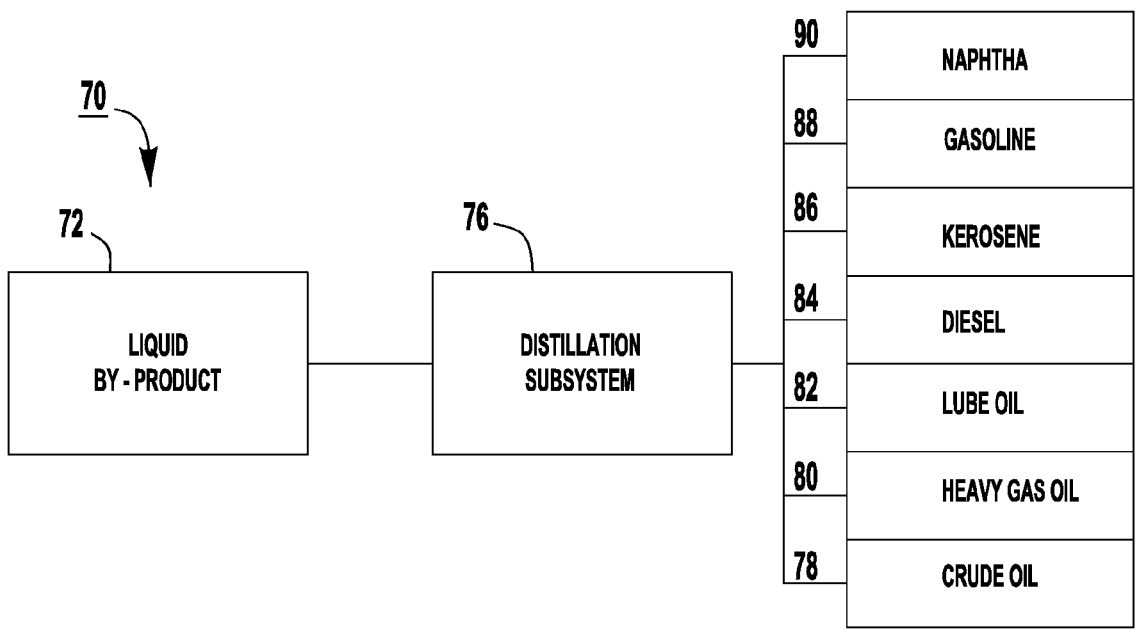
Figure 7:
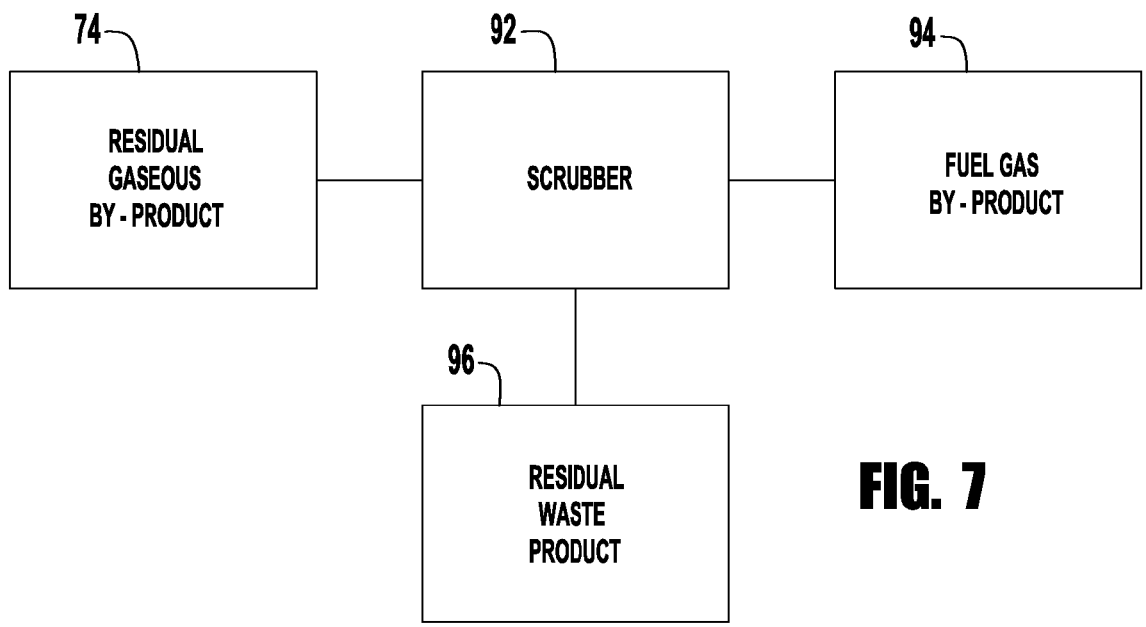
Figure 8:
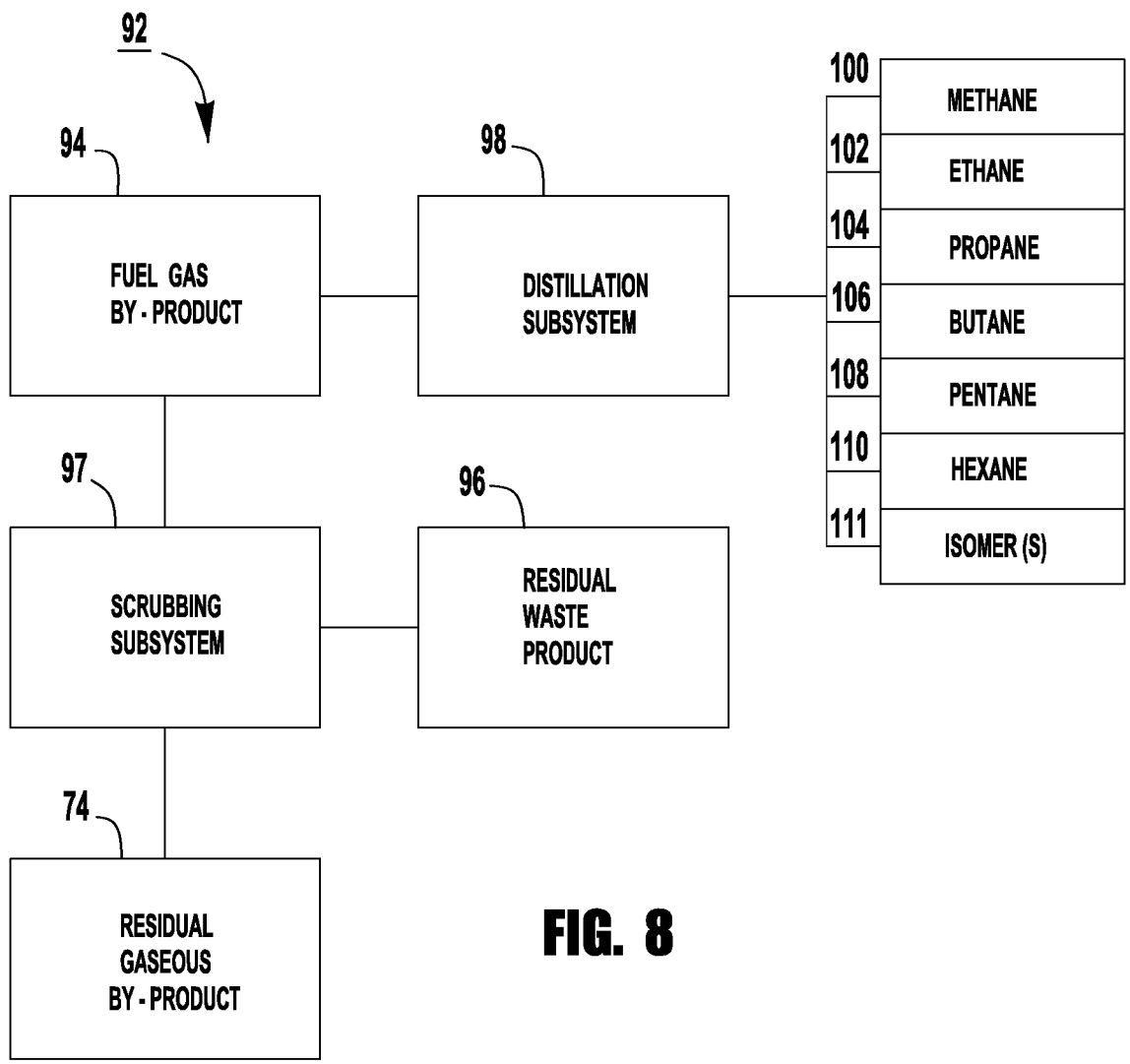
Figure 9:
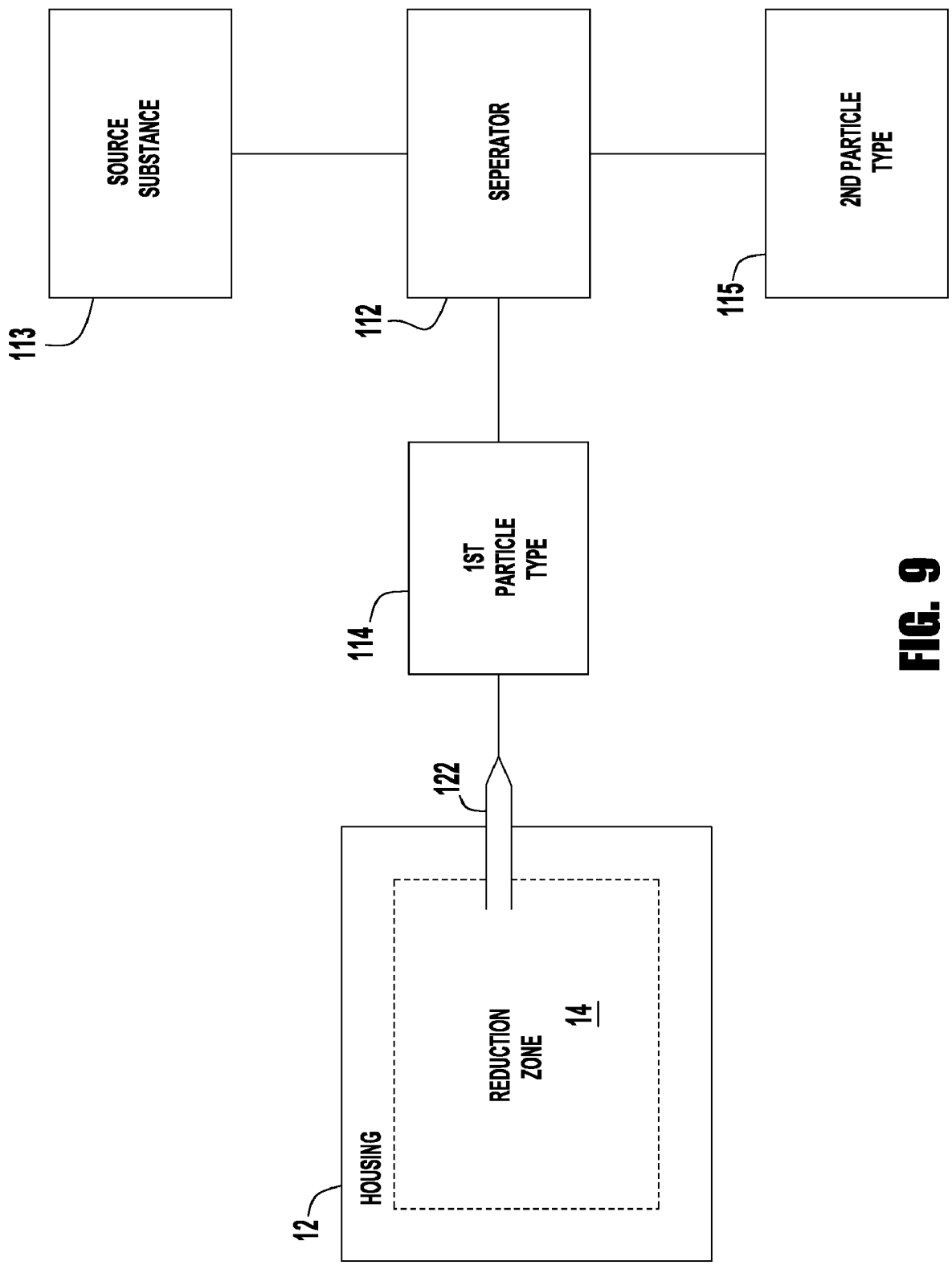
Figure 10:
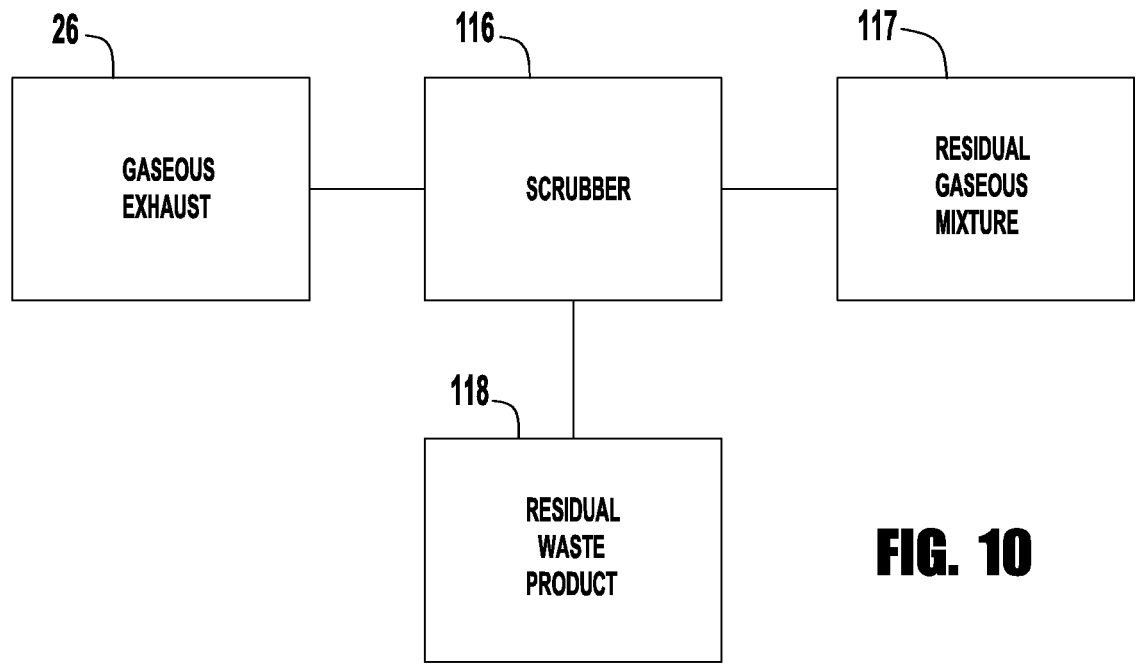
Figure 11:
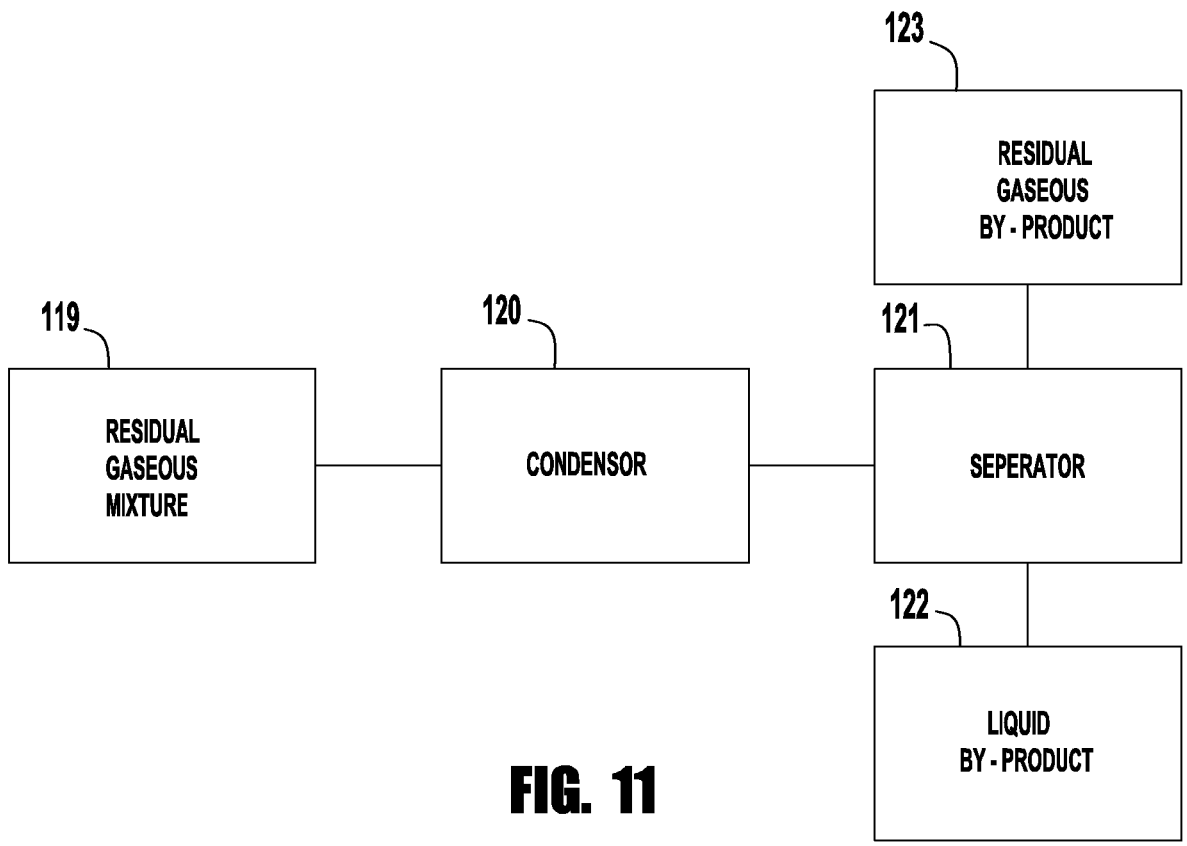
Figure 12:
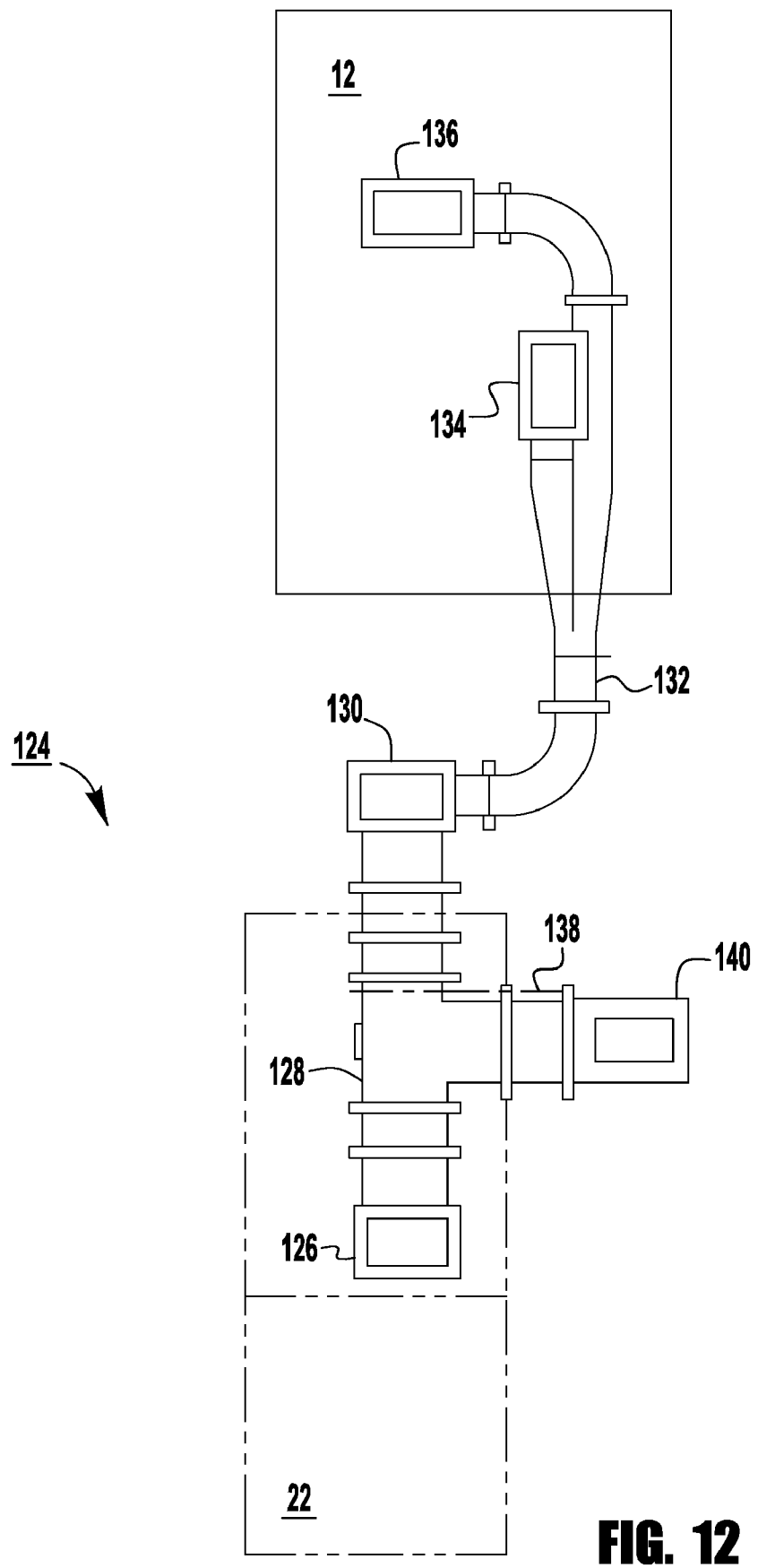
Figure 13:
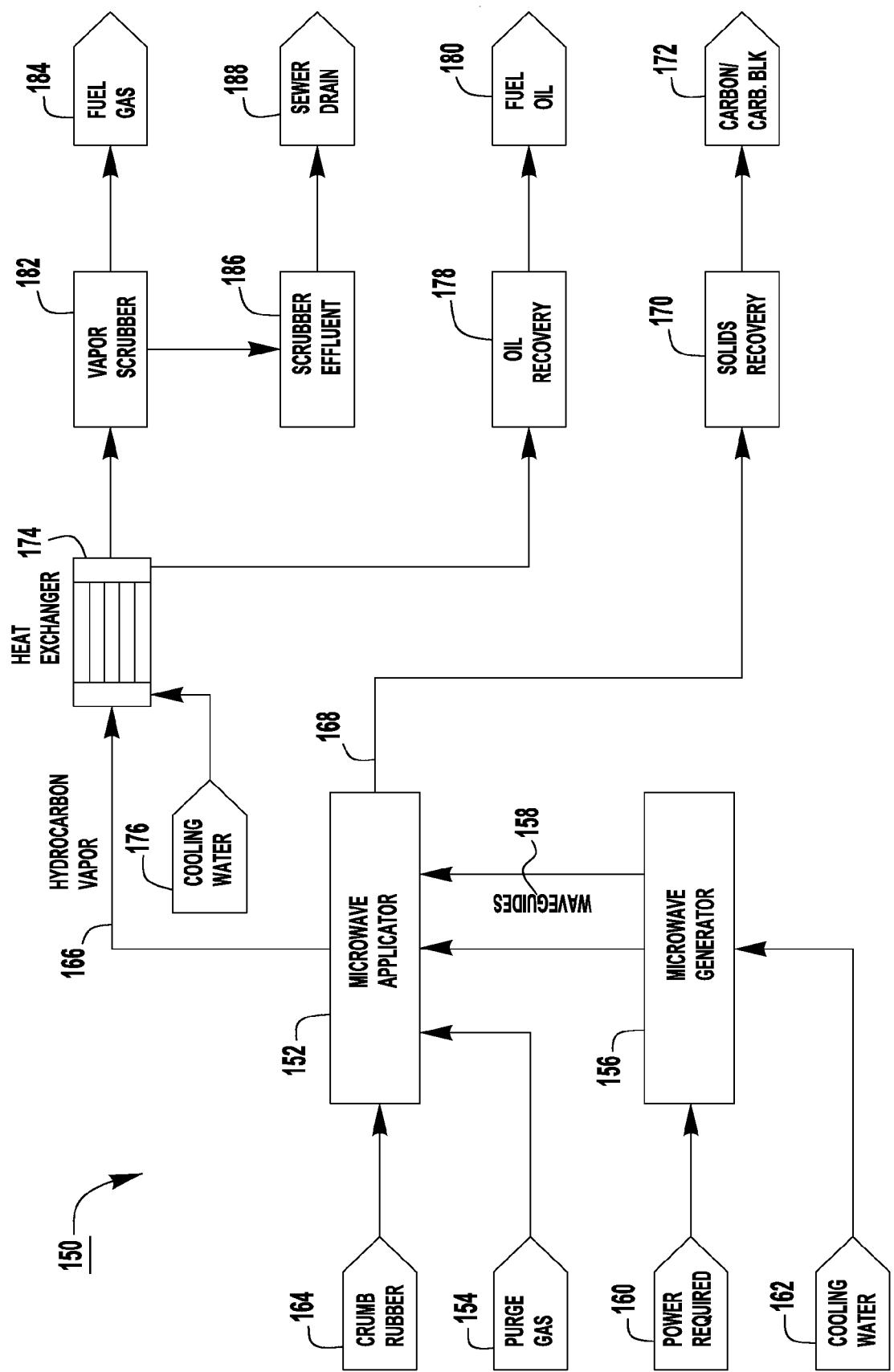
Figure 14:
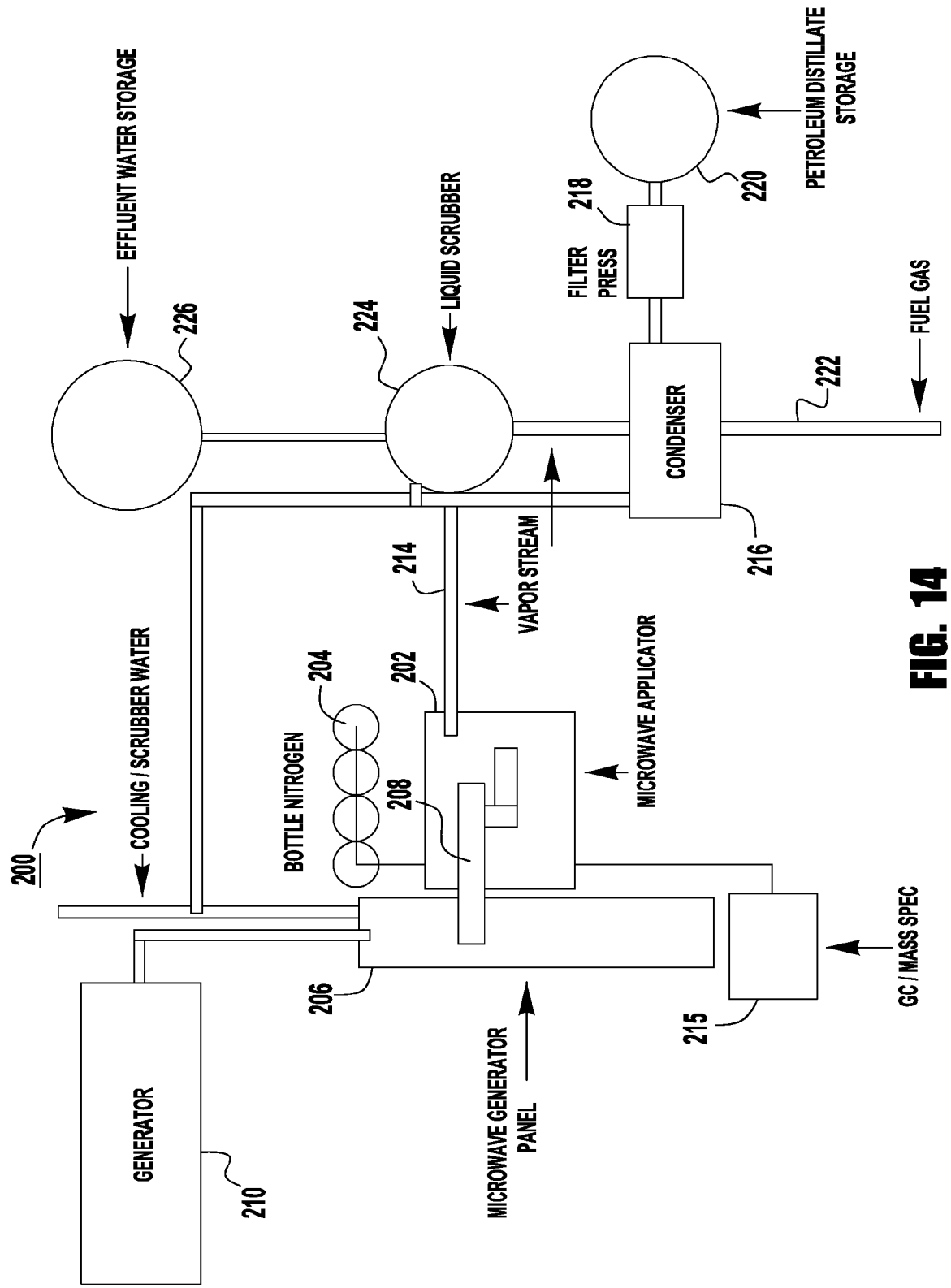
Figure 15:
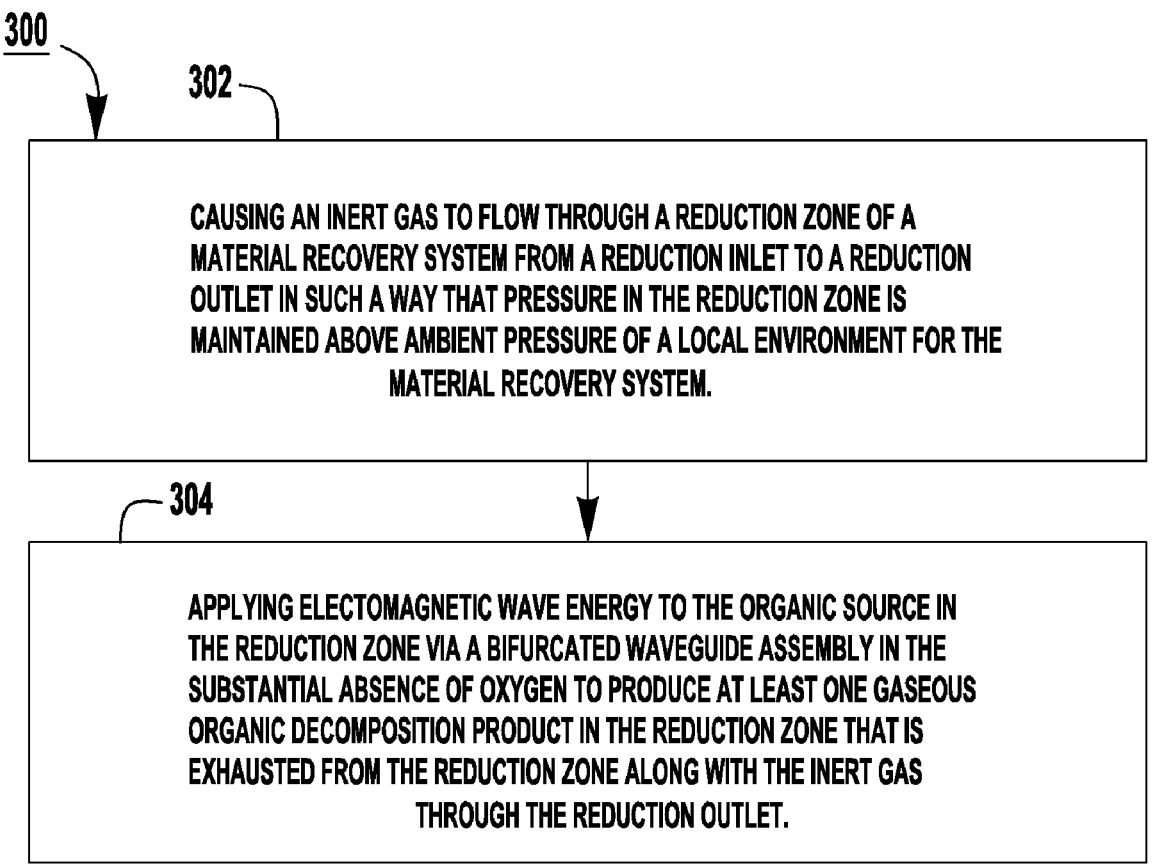
Figure 16:
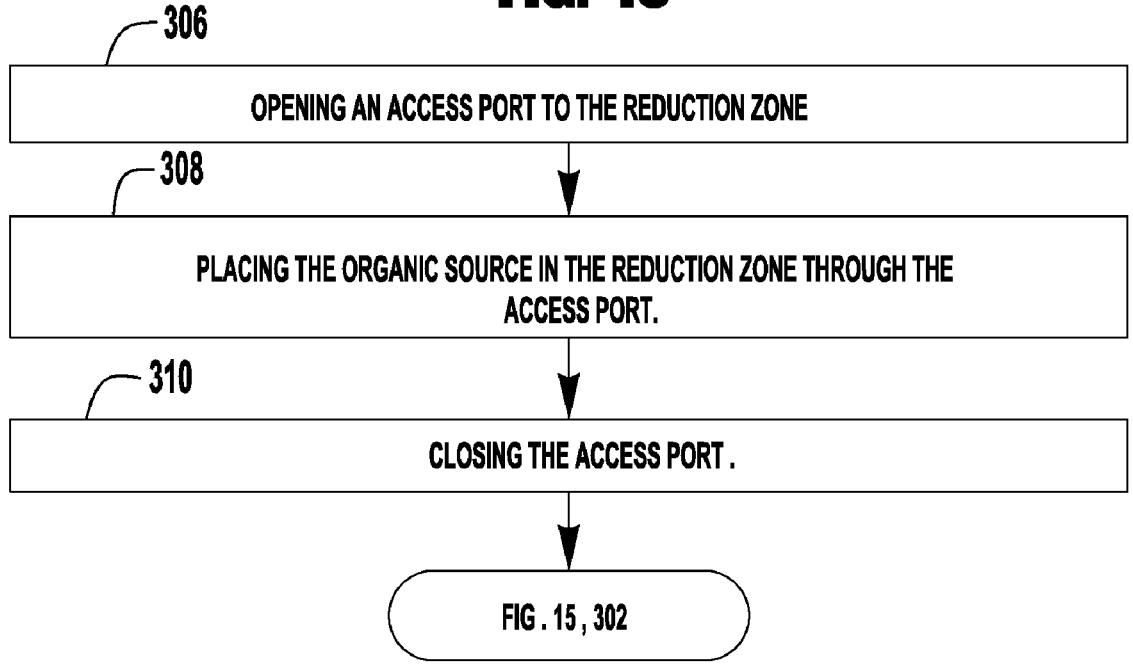
Figure 17:
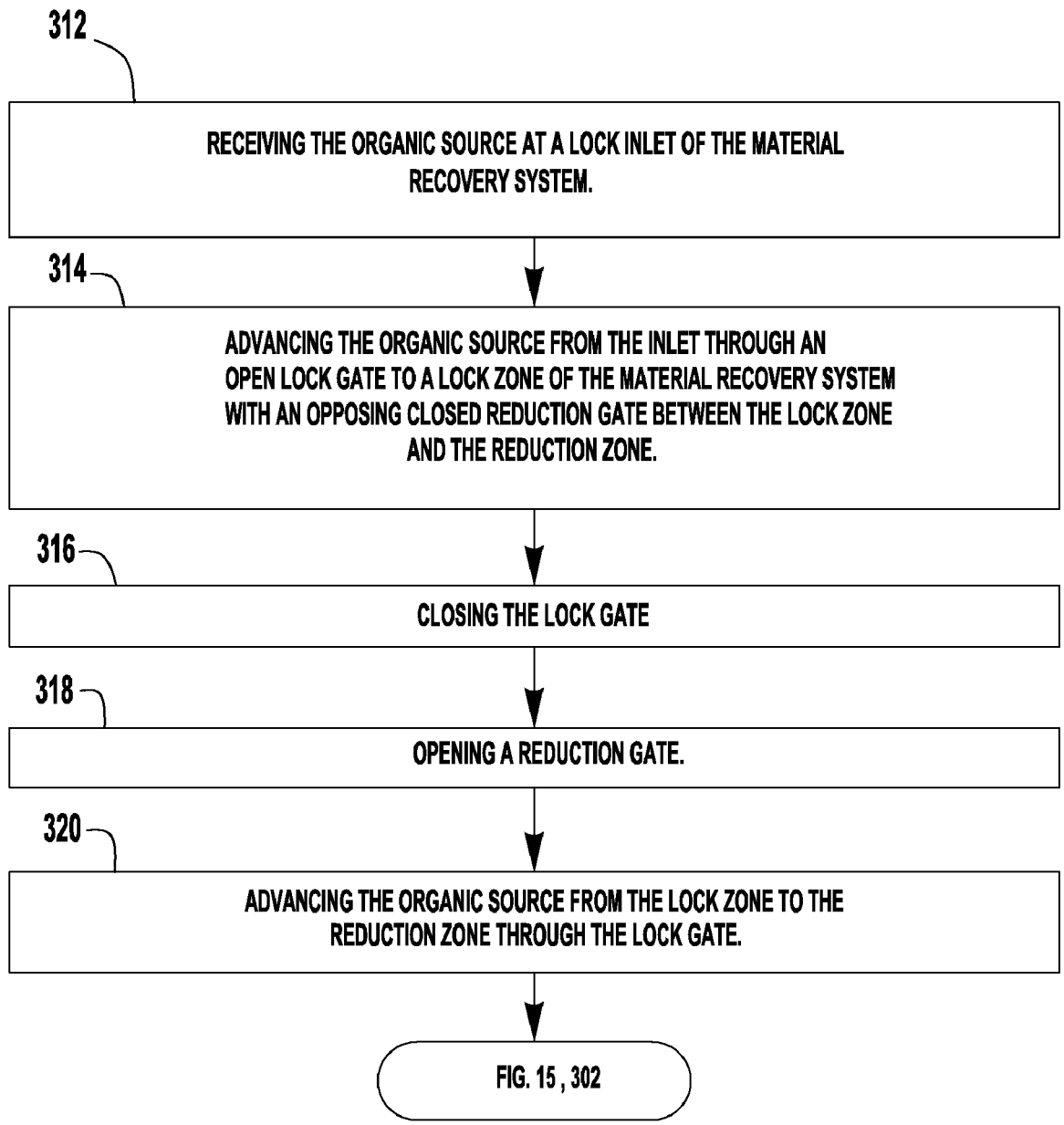
Figure 18:
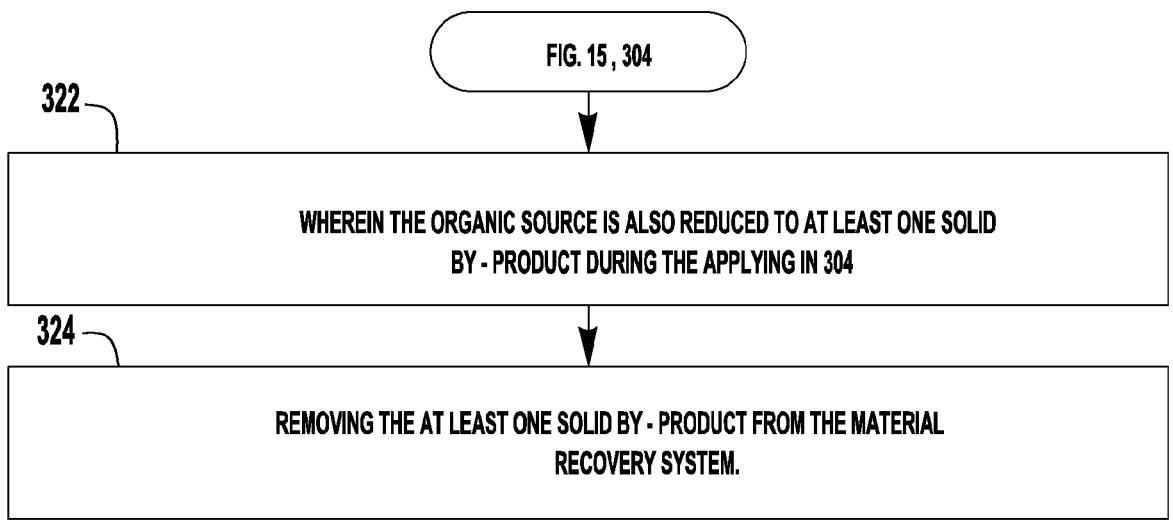
Figure 19:
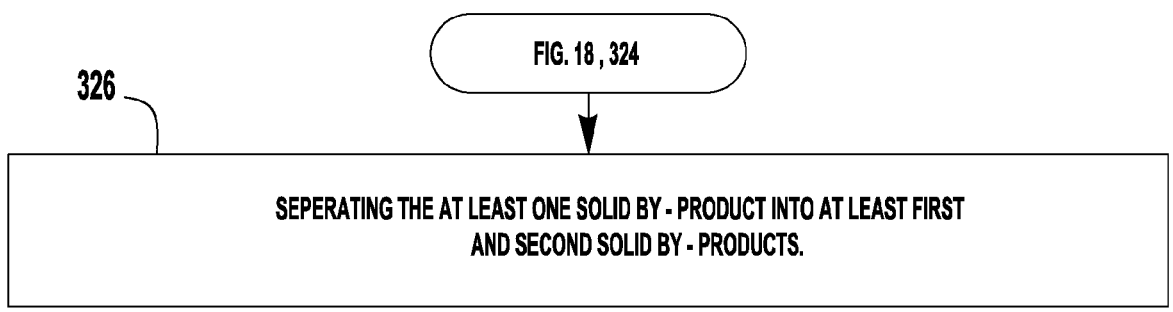
Figure 20:
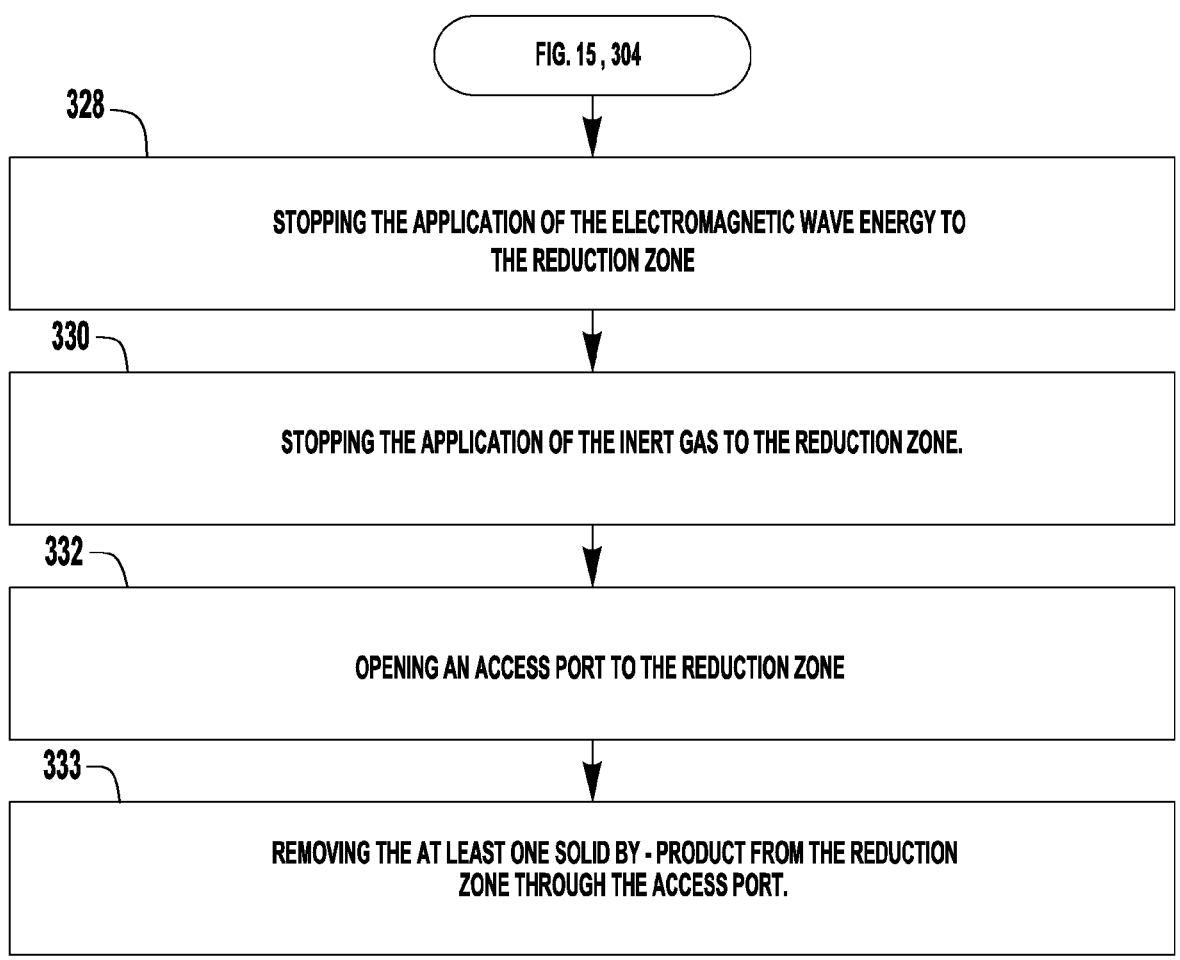
Figure 21:
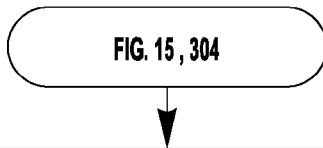
Figure 22:
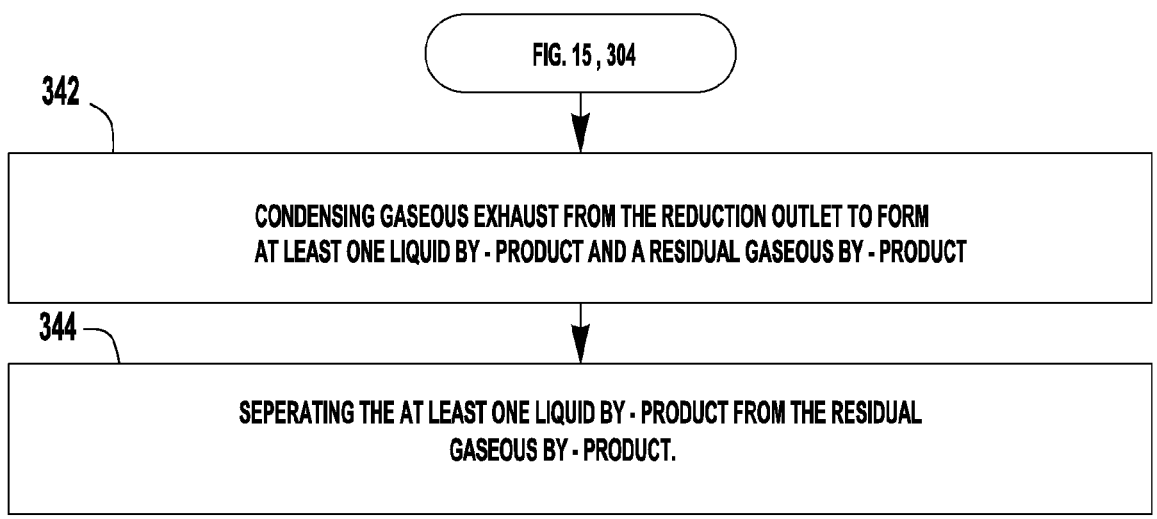
Figure 23:
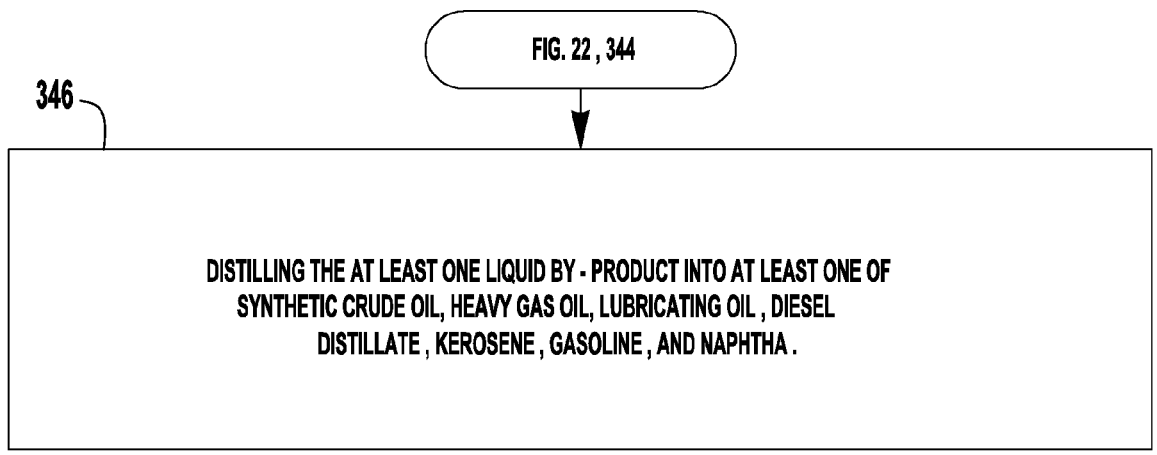
Figure 24:
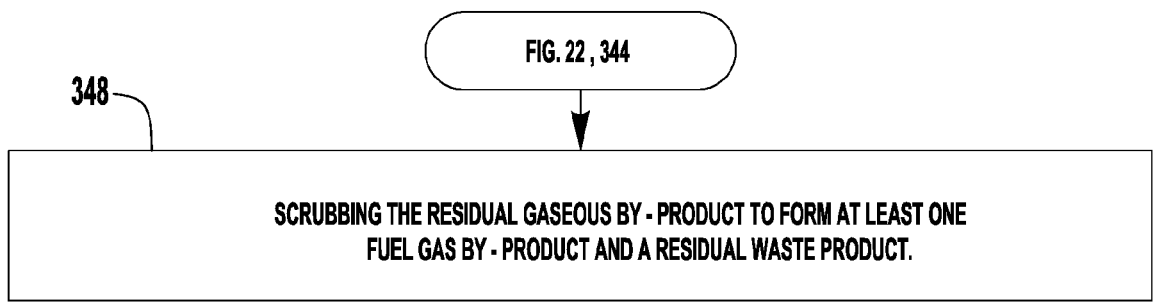
Figure 27:
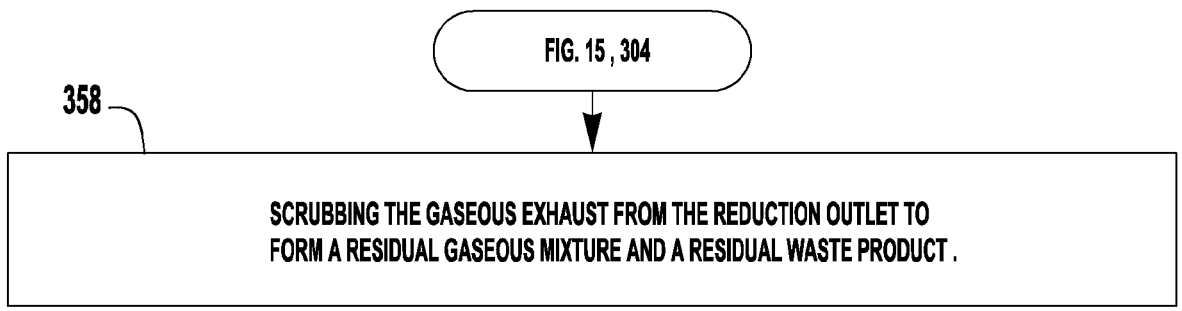
Figure 28:
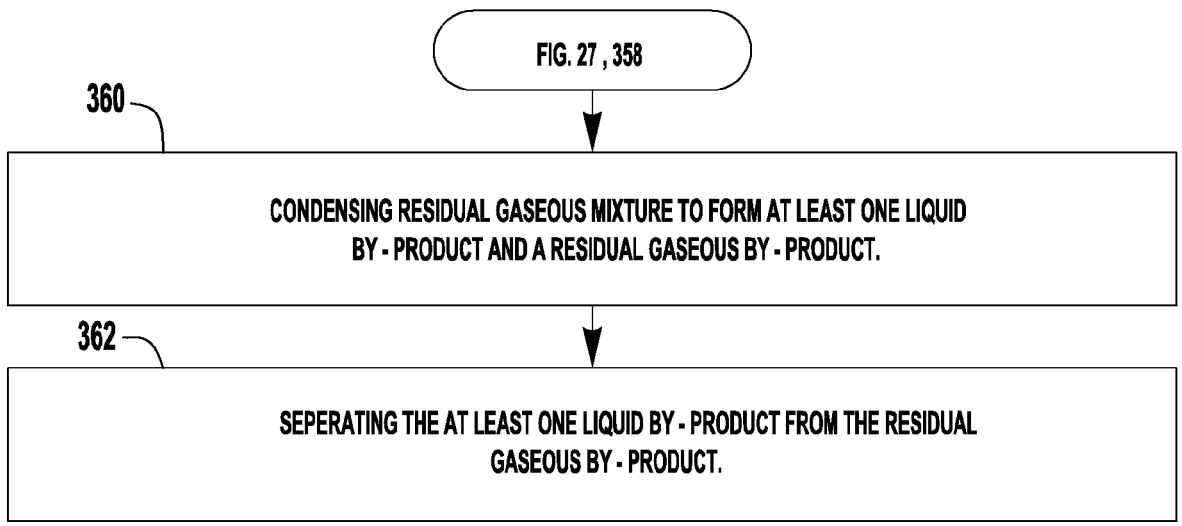
Figure 29:
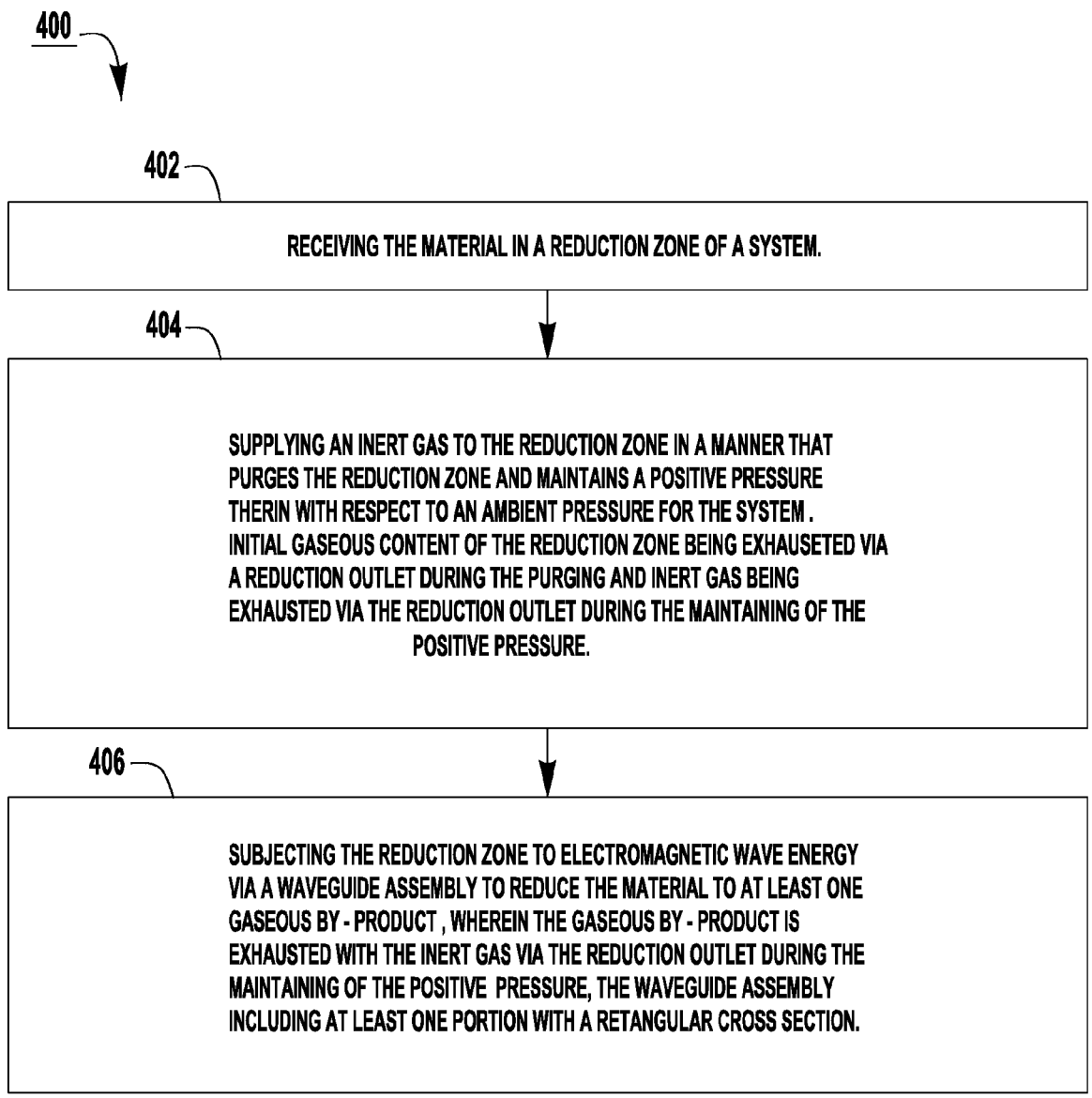
Figure 30:
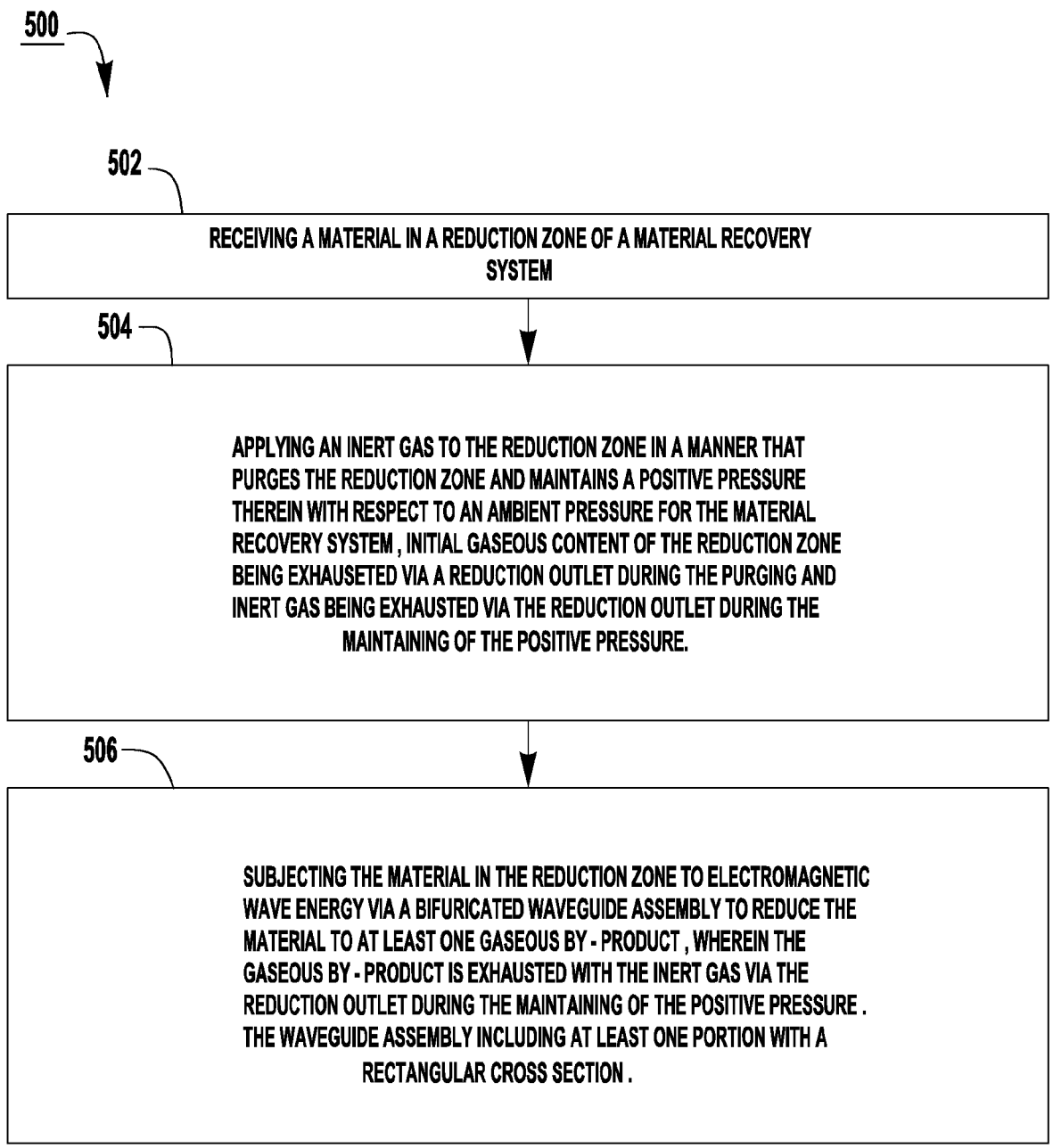

FIG. 4, in combination with FIG. 1, is a block diagram of another exemplary embodiment of a material recovery system;

FIG. 5, in combination with FIG. 1, is a block diagram of yet another exemplary embodiment of a material recovery system;

FIG. 6 is a block diagram of an exemplary embodiment of a separator for the material recovery system of FIG. 5;

FIG. 7, in combination with FIG. 5, is a block diagram of still yet another exemplary embodiment of a material recovery system;

FIG. 8 is a block diagram of an exemplary embodiment of a scrubber for the material recovery system of FIG. 7;

FIG. 9, in combination with FIG. 1, is a block diagram of yet another exemplary embodiment of a material recovery system;

FIG. 10, in combination with FIG. 1, is a block diagram of still yet another exemplary embodiment of a material recovery system;

FIG. 11, in combination with FIG. 10, is a block diagram of another exemplary embodiment of a material recovery system;

FIG. 12 is a layout diagram of an exemplary embodiment of a waveguide assembly and associated components for the material recovery system of FIG. 1;

FIG. 13 is a block diagram of another exemplary embodiment of a material recovery system;

FIG. 14 is a block diagram of still another exemplary embodiment of a material recovery system;

FIG. 15 is a flow chart of an exemplary embodiment of a process for recovering at least one organic decomposition product from an organic source in an essentially gas-tight reduction zone of a material recovery system;

FIG. 16, in combination with FIG. 15, is a flow chart of another exemplary embodiment of a process for recovering at least one organic decomposition product from an organic source;

FIG. 17, in combination with FIG. 15, is a flow chart of yet another exemplary embodiment of a process for recovering at least one organic decomposition product from an organic source;

FIG. 18, in combination with FIG. 15, is a flow chart of still another exemplary embodiment of a process for recovering at least one organic decomposition product from an organic source;

FIG. 19, in combination with FIG. 18, is a flow chart of still yet another exemplary embodiment of a process for recovering at least one organic decomposition product from an organic source;

FIG. 20, in combination with FIG. 15, is a flow chart of another exemplary embodiment of a process for recovering at least one organic decomposition product from an organic source;

FIG. 21, in combination with FIG. 15, is a flow chart of yet another exemplary embodiment of a process for recovering at least one organic decomposition product from an organic source;

FIG. 22, in combination with FIG. 15, is a flow chart of still another exemplary embodiment of a process for recovering at least one organic decomposition product from an organic source;

FIG. 23, in combination with FIG. 22, is a flow chart of still yet another exemplary embodiment of a process for recovering at least one organic decomposition product from an organic source;

FIG. 24, in combination with FIG. 22, is a flow chart of another exemplary embodiment of a process for recovering at least one organic decomposition product from an organic source;

FIG. 25, in combination with FIG. 24, is a flow chart of yet another exemplary embodiment of a process for recovering at least one organic decomposition product from an organic source;

FIG. 26, in combination with FIG. 15, is a flow chart of still another exemplary embodiment of a process for recovering at least one organic decomposition product from an organic source;

FIG. 27, in combination with FIG. 15, is a flow chart of still yet another exemplary embodiment of a process for recovering at least one organic decomposition product from an organic source;

FIG. 28, in combination with FIG. 27, is a flow chart of another exemplary embodiment of a process for recovering at least one organic decomposition product from an organic source;

FIG. 29 is a flow chart of an exemplary embodiment of a process for recovering a by-product from a material; and FIG. 30 is a flow chart of an exemplary embodiment of a process for destructive distillation.

DESCRIPTION

The following paragraphs include definitions of exemplary terms used within this disclosure. Except where noted otherwise, variants of all terms, including singular forms, plural forms, and other affixed forms, fall within each exemplary term meaning. Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or another programmed logic device. A circuit may also be fully embodied as software. Additionally, a circuit may include a sensor, detector, or emitter/detector combination. As used herein, "circuit" is considered synonymous with "logic."

"Comprising," "containing," "having," and "including," as used herein, except where noted otherwise, are synonymous and open-ended. In other words, usage of any of these terms (or variants thereof) does not exclude one or more additional elements or method steps from being added in combination with one or more delineated elements or method steps.

"Computer communication," as used herein includes, but is not limited to, a communication between two or more computer components and can be, for example, a network transfer, a file transfer, an applet transfer, an e-mail, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer component," as used herein includes, but is not limited to, a computer-related entity, either hardware, firmware, software, a combination thereof, or software in execution. For example, a computer component can be, but is not limited to being, a processor, an object, an executable, a process running on a processor, a thread of execution, a program and a computer. By way of illustration, both an application running on a server and the server can be computer components. One or more computer components can reside within a process or thread of execution and a computer component can be localized on one computer or distributed between two or more computers.

"Controller," as used herein includes, but is not limited to, any circuit or device that coordinates and controls the operation of one or more input or output devices. For example, a controller can include a device having one or more processors, microprocessors, or central processing units (CPUs) capable of being programmed to perform input or output functions.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. Additionally, a circuit may include a sensor, detector, or emitter/detector combination. As used herein, "logic" is considered synonymous with "circuit."

"Measurement," as used herein includes, but is not limited to, an extent, magnitude, size, capacity, amount, dimension, characteristic, or quantity ascertained by estimating or appraising a property, characteristic, condition, criterion, or other metric. Example measurements may be provided, but such examples are not intended to limit the scope of measurements that the systems and methods described herein can employ.

"Operable connection" (or a connection by which entities are "operably connected"), as used herein includes, but is not limited to, a connection in which signals, physical communication flow, or logical communication flow may be sent or received. Usually, an operable connection includes a physical interface, an electrical interface, or a data interface, but an operable connection may include differing combinations of these or other types of connections sufficient to allow operable control.

"Operative communication," as used herein includes, but is not limited to, a communicative relationship between devices, logic, or circuits, including mechanical and pneumatic relationships. Direct and indirect electrical, electromagnetic, and optical connections are examples of connections that facilitate operative communications. Linkages, gears, chains, belts, push rods, cams, keys, attaching hardware, and other components contributing to mechanical relations between items are examples of components facilitating operative communications. Pneumatic devices and interconnecting pneumatic tubing may also contribute to operative communications. Two devices are in operative communication if an action from one causes an effect in the other, regardless of whether the action is modified by some other device. For example, two devices in operable communication may be separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) IEEE 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or' is used to describe a list of alternative things in which one may choose one option or any combination of alternative options. For example, "A or B" means "A or B or both" and "A, B, or C" means "A, B, or C, in any combination or permutation." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combinations of alternatives are not included in the choices associated with the list.

"Processor," as used herein includes, but is not limited to, one or more of virtually any number of processor systems or stand-alone processors, such as microprocessors, microcontrollers, central processing units (CPUs), distributed processors, paired processors, and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or another electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system, or other types of executable instructions. It will be appreciated by one of ordinary skill in the art that the form of software is dependent on, for example, requirements of a desired application, the environment it runs on, or the desires of a designer/programmer or the like.

"Software component," as used herein includes, but is not limited to, a collection of one or more computer readable or executable instructions that cause a computer or other electronic device to perform functions, actions or behave in a desired manner. The instructions may be embodied in various forms like routines, algorithms, modules, methods, threads, or programs. Software components may be implemented in a variety of executable or loadable forms including, but not limited to, a stand-alone program, a servelet, an applet, instructions stored in a memory, and the like. Software components can be embodied in a single computer component or can be distributed between computer components.

Spatially relative terms, such as "beneath," "below," "lower," "above," "upper" and the like, may be used herein for ease of description to describe an element, a relationship of an element to another elements, or other features. It will be understood that the spatially relative terms are intended to encompass different orientations of the element in use or operation in addition to orientations depicted in the drawings. For example, if the element in the drawings is turned over, elements described as "below" or "beneath" other elements or features would then be oriented "above" the other elements or features. Thus, the exemplary term "below" can encompass both an orientation of above and below. The element may be otherwise oriented, rotated 90 degrees, or at other orientations and the spatially relative descriptors used herein interpreted accordingly.

The terminology used herein is for the purpose of describing particular embodiments and is not intended to be limit the invention to other embodiments. As used herein, the singular forms "a," "an" and "the" are intended to include the plural forms as well, unless the context clearly indicates otherwise.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with the meaning in the context of the relevant art and will not be interpreted in an idealized or overly formal sense unless expressly so defined herein.

The following table includes long form definitions of exemplary acronyms, abbreviations, and labels for variables and constants in mathematical or logical expressions used within this disclosure. Except where noted otherwise, variants of all acronyms, including singular forms, plural forms, and other affixed forms, fall within each exemplary acronym meaning. Except where noted otherwise, capitalized and non-capitalized forms of all acronyms fall within each meaning.

| Acronym | Long Form |
|---|---|
| ASIC | Application specific integrated circuit |
| BLOB | Binary large object |
| BTU | British thermal unit |
| C | Centigrade |
| cfm | Cubic feet per minute |
| CO | Carbon monoxide |
| CPU | Central processing unit |
| DSP | Digital signal processor |
| EIA | Electronic Industries Association |
| EPA | Environmental Protection Agency |
| EPROM | Erasable programmable read-only memory |
| F | Fahrenheit |
| FID | Flame ionization detector |
| GC | Gas chromatograph |
| gpm | Gallons per minute |
| HTTP | Hypertext transfer protocol |
| kW | Kilowatt |
| LAN | Local area network |
| mA | Milliamp |
| MHz | Megahertz |
| mm | Millimeter |
| Acronym | Long Form |
| MS | Mass spectrometer |
| $NO_x$ | Nitrogen oxides |
| PAH | Polycyclic aromatic hydrocarbon |
| PCB | Polychlorinated biphenyl |
| PLC | Programmable logic controller |
| PROM | Programmable read-only memory |
| psia | Pounds per square inch absolute |
| psig | Pounds per square inch gauge |
| RAM | Random access memory |
| ROM | Read-only memory |
| SCADA | Supervisory control and data acquisition |
| $SO_x$ | Sulfur oxides |
| VOC | Volatile organic compound |
| WAN | Wide area network |

Various embodiments of systems and methods associated therewith that use electromagnetic wave technology to reduce materials to useful by-products or residual waste products without producing harmful waste or emissions are disclosed herein. Applications involving, for example, polymers, including rubber, may use a process referred to as a reduction cycle to reduce the corresponding material to its constituent molecules and simpler compounds. Another application, such as soil remediation, may be referred to a destruction process since organic contaminants are destroyed in a set of irreversible reactions. Harmful contaminants may be destroyed so that waste and emissions from such applications may only include contaminants that are reduced to smaller, safer, EPA-acceptable compounds. For example, soil recovered from an application that processes contaminated soil may be used as approved fill without further processing. The systems and methods disclosed herein do not reduce inorganic materials to simpler compounds. Additionally, the systems and methods disclosed herein are not effective at reducing large amounts of metal to constituent molecules or simpler compounds without degrading or damaging electromagnetic wave applicator.

In as much as organic materials are combustible, a continuous, pressurized, inert purge gas may be present in an electromagnetic wave applicator to prevent combustion. The applicator may be designed as a sealed unit that is capable of pressurization, for example, to about 50 psig. Aluminum or stainless steel (e.g., Type 316) may be used to construct the applicator to provide strength and corrosion resistance.

During operation of the reduction cycle, electromagnetic wave energy may excite certain solid materials present in the applicator. This excitation may convert the subject material to a gas. Gaseous reactions produced by exciting organic materials using electromagnetic wave energy may result in various complex products, such as any combination of those listed in the table below.

TABLE

| COMMON NAME | FORMULA | STRUCTURE |
|---|---|---|
| Methane | $CH_4$ | $C-H_4$ |
| Ethylene | $C_2H_4$ | $CH_2=CH_2$ |
| Ethane | $C_2H_6$ | $CH_3-CH_3$ |
| Acetylene | $C_2H_2$ | $CH\equiv CH$ |
| Propene | $C_3H_6$ | $CH_3-CH-CH_3$ |
| Propane | $C_3H_8$ | $CH_3-CH_2-CH_3$ |
| cyclo-Propene | $C_3H_4$ | |
| Propadiene | $C_3H_4$ | $CH_2=C=CH_2$ |
| cyclo-Propane | $C_3H_6$ | |
| Propyne | $C_3H_4$ | $CH_3-C\equiv H$ |
| i-Butane | $C_4H_{10}$ | $(CH_3)_2-CH-CH_3$ |
| i-Butylene | $C_4H_8$ | $(CH_3)_2-C=CH_2$ |
| 1-Butene | $C_4H_8$ | $CH_3-CH_2-CH=CH_2$ |
| 1,3-Butadiene | $C_4H_6$ | $CH_2=CH-CH=CH_2$ |
| n-Butane | $C_4H_{10}$ | $CH_3-CH_2-CH_2-CH_3$ |
| cyclo-Butene | $C_4H_6$ | |
| 1-Buten-3-yne | $C_4H_4$ | $CH\equiv C-CH=CH_2$ |
| 1-Butyne | $C_4H_6$ | $CH\equiv C-CH_2-CH_3$ |
| 1,3-Butadiyne | $C_4H_2$ | $CH\equiv C-C\equiv CH$ |
| 1,2-Butadiene | $C_4H_6$ | $CH_3-CH=C=CH_2$ |
| cyclo-Butane | $C_4H_8$ | |
| 1,4-Pentadiene | $C_5H_8$ | $CH_2=CH-CH_2-CH=CH_2$ |
| 2-Butyne | $C_4H_6$ | $CH_3-C\equiv C-CH_3$ |
| i-Pentane | $C_5H_{12}$ | $(CH_3)_2-CH-CH_2-CH_3$ |
| 1-Pentene | $C_5H_{10}$ | $CH_3-CH_2-CH_2-CH=CH_2$ |
| Isoprene | $C_5H_8$ | $CH_2=C-(CH_3)-CH=CH_2$ |
| n-Pentane | $C_5H_{12}$ | $CH_3-CH_2-CH_2-CH_2-CH_3$ |
| cyclo-Pentadiene | $C_5H_6$ | |
| 1,3-Pentadiene | $C_5H_8$-trans | $CH_3-CH=CH-CH=CH_2$ |
| 1,3-Pentadiene | $C_5H_8$-cis | $CH_3-CH=CH-CH=CH_2$ |
| cyclo-Pentene | $C_5H_8$ | |
| 1,2-Pentadiene | $C_5H_8$ | $CH_3-CH_2-CH=C=CH_2$ |
| 2,3-Pentadiene | $C_5H_8$ | $CH_2=C-(CH_3)-CH=CH_2$ |
| cyclo-Pentane | $C_5H_{10}$ | |
| 1,5-Hexadiene | $C_6H_{10}$ | $CH_2=C-CH_2-CH_2-CH=CH_2$ |
| 1-Hexene | $C_6H_{12}$ | $CH_3-CH_2-CH_2-CH_2-CH=CH_2$ |
| n-Hexane | $C_6H_{14}$ | $CH_3-CH_2-CH_2-CH_2-CH_2-CH_3$ |
| Benzene | $C_6H_6$ | |
| cyclo-Hexane | $C_6H_{12}$ | |
| cyclo-Hexene | $C_6H_{10}$ | |
| Toluene | $C_7H_8$ | $C_6H_5-CH_3$ |
| Ethylbenzene | $C_8H_{10}$ | $C_6H_5-CH_2-CH_3$ |
| p-Xylene | $C_8H_{10}$ | $C_6H_4-(CH_3)_2$ |
| m-Xylene | $C_8H_{10}$ | $C_6H_4-(CH_3)_2$ |
| Phenylacetylene | $C_8H_6$ | $C_6H_5-C\equiv CH$ |
| o-Xylene | $C_8H_{10}$ | $C_6H_4-(CH_3)_2$ |
| Styrene | $C_8H_8$ | $C_6H_5-CH=CH_2$ |
| Cumeme | $C_9H_{12}$ | $C_6H_5-CH-(CH_3)_2$ |
| Phenol | $C_6H_6O$ | $C_6H_5-OH$ |
| Naphthalene | $C_{10}H_8$ | $C_4H_4-C\equiv C-C_4H_4$ |
| Biphenyl | $C_{12}H_{10}$ | $C_6H_5-C_6H_5$ |
| Phenantrene | $C_{14}H_{10}$ | $C_6H_4-CH=CH-C_6H_4$ |
| p-Terphenyl | $C_{18}H_{14}$ | $C_6H_5-C_6H_4-C_6H_5$ |
| Pyrene | $C_{16}H_{10}$ | $C_6H_3-CH=CH-CH=CH-C_6H_3$ |
| Hydrogen Chloride | HCl | $H-Cl$ |
| Hydrogen Sulfide | $H_2S$ | $H-S-H$ |
| Ammonia | $NH_3$ | $H-NH-H$ |
| Hydrogen Cyanide | HCN | $H-C\equiv N$ |
| Methanol | $CH_4O$ | $CH_3-OH$ |
| Air, Dry (78% $N_2$, 21% $O_2$, 1% trace inert gases) | | |
| Nitrogen | $N_2$ | $N-N$ |
| Oxygen | $O_2$ | $O-O$ |
| Water Vapor | $H_2O$ | $H-O-H$ |

The applicator may be purged with an inert gas, such as nitrogen or argon, to displace any air within the applicator. Nitrogen gas, for example, may be a more economical choice. The purge gas, for example, may be supplied from the process gas stream using a nitrogen generator or a pressurized nitrogen source. The nitrogen generator may include a molecular sieve capable of generating nitrogen, for example, at a purity of approximately 98%. The pressurized nitrogen source may include a primary storage tank or a cascaded arrangement of cylinders. There is a continuous flow of the inert gas into the applicator chamber that carries process gases from the chamber to additional components of the system (e.g., condenser) during the reduction cycle.

In the event of a purge gas generator failure, the high voltage electromagnetic wave generator system may be shutdown and a standby or backup auxiliary inert gas source may purge the applicator for a predetermined time to allow for a cool down cycle. The cool down cycle may allow the material temperature in the applicator to be reduced below the reaction temperature. This also allows the electromagnetic wave sources (e.g., magnetrons) to cool to a level specified by the manufacturer. The cool down cycle may continue for at least a predetermined time and until the reaction has ceased as determined from monitoring the process gases using, for example, a gas chromatograph (GC). Temperatures in the applicator cavity, condenser, and cooling system may be monitored via temperature transducers that supply a 4 to 20 mA analog signal to a controller associated with the electromagnetic wave generator.

Due to the variety of products created during a reduction cycle, the content of the applicator vessel or exhaust stream may be continuously monitored by, for example, a GC to identify the product makeup and to determine when to shut down the electromagnetic wave generator. The reduction cycle, for example, can be a batch process. A batch is defined as the amount of material that can be processed within the applicator vessel at one time. Alternatively, a continuous reduction cycle with a pressurized and sealed assembly line can be used instead of a single, discrete applicator vessel. The continuous reduction cycle may improve the economy of the process in certain applications, such as tire reduction.

The continuous reduction cycle may use a feed forward implementation of the batch process to maintain the positive pressure integrity of the applicator while allowing for maximum throughput and advancement of the subject material through the active area of the applicator during operation. The feed forward implementation may be described as a procession of subject material in a "continuous" batch from introduction of subject material into the applicator cavity to its exit of the reduced solid by-products (e.g., carbon/carbon black for scrap tires). This may be accomplished via controlled entrance of the subject material and exit of the reduced solids through pressurized segments or locks in the applicator housing. This modified batch (or semi-continuous) scheme may provide a continuous process that improves the economics and efficiency. The line speed for material trays in this semi-continuous process may vary, for example, from 3 to 8 inches per minute, depending upon cavity dimensions and the output power level of the electromagnetic wave generator.

Electromagnetic wave energy may be propagated, for example, by commercially available magnetrons from the electromagnetic wave generator. The electromagnetic wave energy may be conducted to the applicator cavity via aluminum or stainless steel (e.g., Type 316) waveguides that comply, for example, with Electronic Industries Association (EIA) WR975 specifications. The torque specification for microwave flanges may be 10 to 25 foot-pounds, preferably 15 to 20 foot-pounds. A fused quartz glass pressure window may be provided at the cavity flange ports to keep process gas from entering the waveguides and subsequently entering the electromagnetic wave generator. The fused quartz glass may be constructed to fit the WR975 waveguide flange and may be ⅛ to ¼ inches thick.

The waveguides may incorporate a splitter or bifurcated section that introduces the electromagnetic wave energy into the cavity in a multi-mode fashion. The splitter or bifurcated waveguide may cause the electromagnetic wave energy to be "split" into what appears to be two sources that are out of phase with each another. This causes a mode stirring effect that may provide a more even dispersal of energy within the cavity and higher efficiency than a single mode arrangement with one waveguide port. A mechanical stirring subsystem, such as a rotating tray, may be used in a system with one waveguide port to creating a similar mode stirring effect.

Preferred applicator cavity dimensions may be determined by the frequency of the electromagnetic wave energy employed in the process. For example, if 915 MHz is the nominal frequency for the electromagnetic wave generator, a certain cavity height and width are preferred to obtain maximum penetration of the electromagnetic wave energy into the target material. The internal volume or cavity of the applicator may be referred to as the active area or reduction zone.

The preferred height and width of the applicator cavity or reduction zone may be dimensions multiples of 0.9 to 1.5 times the wavelength of the electromagnetic wave energy, preferably multiples of 0.932 to 1.08 times the wavelength. For example, for 915 MHz (i.e., about 327 mm wavelength) electromagnetic wave energy in free air, the preferred height and width of the applicator cavity or reduction zone may be dimensions that are multiples of about 295 mm to about 491 mm, preferably about 305 mm to about 354 mm. Additionally, the ratio of the height dimension to the width dimension may be about ⅔ and the length may be the same as the height. For example, a single applicator section (e.g., housing with reduction zone) may be about four (4) feet high, about six (6) feet wide, and about four (4) feet long.

The frequency of the electromagnetic wave generator may also dictate a preferred thickness for the target material to improve the efficiency of the process and increase economic benefits. For example, for polymers with similar specific gravity, density and dipole strength as that of rubber compounds, the preferred thickness of the target material may be about ¼ wavelength. The preferred thickness of target materials for other polymers and organic compounds may be determined by the specific gravity, density and dipole strength of the material. The result may be rounded to the nearest quarter wavelength.

The applicator may be constructed of 6061-T6 extruded aluminum or stainless steel (e.g., Type 316) and may be double walled with mineral wool insulation between the inner and outer walls. Mill paper insulation may be used for gasket material at access ports and other types of openings in the applicator housing or mating surfaces. The mill paper insulation may be about ⅛ inch thick with a minimum rating of at least 1000 degrees Fahrenheit (F).

Upon exit from the applicator vessel or the continuous assembly line, the exhaust gas stream, with its products of reaction developed from molecular excitation by microwave energy, may flow through a temperature controlled, water-cooled condenser. For example, the condenser may be cooled to 15 to 50 degrees Centigrade (C) to obtain desired condensates from the exhaust gas stream. The condenser may include a distillation column. The condensed hydrocarbons can be processed, for example, by fractionalizing or cracking in a distillation column to obtain light oils or liquid fuels that are commercially viable with limited or no further processing. When condensed, heavier organic liquids may separate from lighter gases and may tend to form liquid by-products, such as light distillate oils, diesel fuels, or kerosene. Prior to distillation, the liquid fuels, for example, may be used in an internal combustion engine for power generation. That is to say, the condensed gas stream can be separated such as by distillation into multiple different fractures which are useful by themselves as known hydrocarbon products, e.g., synthetic crude oil, heavy oil, fuel oil, lubricating oil, diesel oil, kerosene, gasoline, and naphtha, or which can be combined with these or other hydrocarbonaceous materials commonly found in most refineries. After fractional distillation, the liquid fuels may be recovered for use as feedstock in plastics production or as other combustible liquid hydrocarbons. The lighter, uncondensed gases may be suitable for combustion in, for example, a gas turbine for power generation or may be flared to the atmosphere where permissible.

Attributes of condensed hydrocarbons at about 16 degrees C. (60 degrees F.) and about 14.7 psia that were recovered from the processing of rubber compounds, such as crumb rubber from scrap tires, may include: i) specific gravity—0.90, ii) British thermal units (BTUs)/pound—18,750, iii) recovery rate—1.8 pounds/minute for 100 kW electromagnetic wave energy applied at 915 MHz, iv) 0.25 gal/minute for 100 kW electromagnetic wave energy applied at 915 MHz, and v) carbon residue—less than 0.01%.

Attributes of process gas at about 16 degrees C. (60 degrees F.) and about 14.7 psia that is recovered from the processing of rubber compounds, such as crumb rubber from scrap tires, may include: i) gas composition—Methane, Ethane, Propane, iso-Butane, n-Butane, and Nitrogen and ii) BTU/cubic feet—1470 to 1610.

In both batch and continuous reduction cycles, the exhaust gas stream from the applicator with the products of reaction developed from the molecular excitation may be carried to a liquid scrubbing system by the pressurized inert gas to remove undesirable contaminants (such as chlorine, bromine, sulphur, etc.). For example, Hydrogen Sulfide may be removed in the tire application. The scrubbing system may treat the gas stream with common chemicals used in water treatment plants, such as Sodium Hydroxide and Sodium Hypochlorite. These chemicals may be added to the solution in such concentrations as may be dictated by the process gas composition to maintain an environmentally benign exhaust to atmosphere if the gas is flared and not recovered for power generation. The waste water containing the reaction products removed from the gas stream may be routed to a scrubber sump and may be discharged in a sanitary sewer system in compliance with EPA requirements regarding effluents. The scrubbing system may be constructed of fiberglass, plastic, or metal. In other embodiments, a filtering system may be used in place of the scrubbing system or in combination with a scrubbing system.

Time and date-stamped data may be provided during operation of the system to assure compliance with applicable federal and state environmental regulations. Such data may also be used to confirm quality and consistency of recovered by-products from the reduction process.

Filters and catalysts may also be integrated into the process gas condensation phase to remove additional sulfur and its related compounds. These filters and catalysts may be integrated prior to the scrubbing process and in conjunction with the condensation phase. Elemental sulfur can be recovered as an additional revenue source or to enhance the marketability of the subsequent fuels as "low sulfur" products.

The systems described herein may include pressure sensors, pressure regulators, flow meters, safety interlocks, power meters, presence sensors, gas leak detectors, electromagnetic wave leak detectors, flue gas analyzers, and fire detection and suppression equipment in any combination. The pressure sensors may detect inert gas pressure, internal cavity pressure, and process gas pressure. The pressure regulators may regulate the pressure of the inert gas applied to the applicator cavity. The flow meters may ensure that pressurized inert gas or process gas is flowing during operation of the system. The safety interlocks may ensure that removable covers, doors, gates, and other components associated with providing a near oxygen-free environment within the cavity are in place prior to pressurizing the cavity or operating the electromagnetic wave generator. The power meters, for example, may monitor power levels of electromagnetic wave energy produced by the electromagnetic wave generator.

The presence sensors may ensure that materials to be processed are in place prior to pressurizing the cavity or operating the electromagnetic wave generator. A system that provides semi-continuous (i.e., continuous batch) or continuous flow of materials to be processed may also include presence sensors that may ensure the materials are properly distributed and positioned at various points along the normal flow path during startup and operation of the system. The gas leak detectors may detect inert gas leaks or process gas leaks. The electromagnetic wave leak detectors may detect leakage of electromagnetic wave energy from the generator, waveguide, or application, particularly leakage from the applicator cavity. The flue gas analyzer may analyze scrubbed gas for undesirable constituents. The fire detection and suppression equipment, for example, may detect flames from the applicator cavity and may include additional nitrogen overflow (i.e., overpressure) to the cavity for fire suppression.

The reduction processes described herein may achieve reduction of polymers and other organic compounds through molecular excitation with high power density electromagnetic waves. For example, the process may recover base constituents of the polymers through electromagnetic wave excitation of the molecules of the subject compound and the resulting reduction to gas and fuel oil. Carbon/carbon black and steel may also be recovered from, for example, tire reduction. For example, the process may convert polymers and certain organic compounds into a process gas stream suitable for combustion in a prime mover or co-generation plant. Fuels distilled from the process gas stream, for example, may require pre-treatment or removal of Hydrogen Sulfide. The fuel oil may be consistent with No. 4 Diesel Fuel (i.e., marine bunker fuel). If the cetane number of the process fuel oil is lower than 30, which is typical for diesel fuel, a cetane additive (available at most automobile supply stores) may be added to the fuel oil to prepare it for use in diesel engines.

Electromagnetic wave energy sources (e.g., magnetrons) do not apply heat directly. Rather, these energy sources introduce excitation in materials to be processed at the molecular level, resulting in the development of heat. The mechanism for production of heat within the material occurs due to rotation of the rubber molecules in either two (2) or three (3) axes for linear and nonlinear molecules, respectively.

The heat developed through molecular rotation and resultant stress generated internally within the molecular structure, lies within the infrared spectrum of electromagnetic frequencies. The infrared developed within the molecule may stimulate vibrations in either five (5) or six (6) modes for linear and non-linear molecules, respectively. The internal infrared excitation of the molecules may produce photons, due to internal conversion of microwave excitation to molecular collisions. During photon absorption, additional heat may be produced. This heat, coupled with the severe strain placed on the chemical bonds of the molecule may be sufficient to break the bonds and cause the formation of free radicals, leading to further decomposition. Further reduction may result in the generation of free electrons and formation of reaction products.

For example, propagation of polymer/organic compound reduction may occur after application of electromagnetic wave energy, converting the solid to a gaseous vapor. Termination of the excitation may occur after removal of the electromagnetic wave energy. In comparison to reduction cycles using only externally-applied heat, the electromagnetic wave reduction cycle operates at lower temperatures. Due to the lower temperatures and the near oxygen-free environment within the cavity of the electromagnetic wave applicator, the creation of dioxins or furans may be reduced or eliminated. Dioxins or furans complicate the environmental results obtained from reduction cycles using only externally-applied heat.

The systems and methods disclosed herein may be used, for example, for tire reduction, plastics reduction, polychlorinated biphenyl (PCB) destruction, or biological waste destruction/incineration. Tire and plastics reduction, for example, may include loading the material to be processed in an electromagnetic wave applicator cavity, purging the cavity with an inert gas, exposing the material to electromagnetic wave energy, condensing exhaust gas from the cavity to liquid hydrocarbons, capturing the liquid hydrocarbons as fuel gas (e.g., either compressing and selling the fuel gas or utilizing it in an engine or turbine for electrical generation), and removing reduced solids from the cavity (e.g., primarily consisting of carbon). The systems and methods disclosed herein are scaleable with respect to dimensions, capacity, and throughput performance.

An exemplary PCB destruction process may include loading contaminated material to be processed in an electromagnetic wave applicator cavity, expose the material to electromagnetic wave energy, monitoring the cavity or exhaust gas stream with, for example, a GC to determine status of the destruction process, and removing re-mediated material from the cavity after the destruction process is considered complete. Similarly, an exemplary biological waste destruction (or incineration) process may include loading contaminated material to be processed in an electromagnetic wave applicator cavity, purging the cavity with an inert gas, exposing the material to electromagnetic wave energy for a predetermined time, and removing decontaminated material from the cavity for disposal in a standard waste stream.

By-products of the tire or rubber reduction process described herein may include light oils, diesel fuel, plastic feedstock, carbon black, fuel gases, steel, and weak acid. The weak acid, for example, may be collected from the scrubber sump. Similarly, by-products of the plastic reduction process described herein may include light oils, plastic feedstock, carbon, and weak acid.

The PCB destruction process described herein may result in subject material that is no longer contaminated (e.g., less than 5 ppm). Similarly, the biological waste destruction process described herein may result in residual waste that is no longer contaminated (e.g., pathogen free).

As described herein, reduction of tires, rubber, and plastics, for example, generate liquid oil and fuel gas by-products. These by-products may be refined further using distillation columns or other processes commonly used in refineries or may be used directly as fuel. Liquid by-products, for example, may be used as fuel for a power plant, such as a diesel engine, or as fuel oil burned in a heater or furnace. Similarly, fuel gas by-products may also be used as fuel for a power plant, such as a turbine engine, or as fuel gas burned in a heater or furnace. A power plant fueled by liquid oil or fuel gas by-products, for example, may serve as a generator to produce electricity which may be used to power the material recovery system. Similarly, a heater or furnace that burns liquid oil or fuel gas by-products may produce heat that may be used to pre-heat materials to be reduced by the material recovery system or as supplemental heat during the reduction process.

The systems and methods disclosed herein may use an environmentally-friendly fuel-producing process to convert environmentally-unacceptable waste into recovered by-products that may produce sales revenue. Additional revenue streams may be realized through the sale of electrical energy generated from recovered gas and liquid fuels and through sales of carbon/carbon black (e.g., N110, N330, N660, N770) and steel to industrial users. In addition to scrap tire disposal and recycling markets, numerous markets, markets associated with the destruction of PCBs in contaminated soil and volumetric reduction of "red bag" hazardous medical waste may benefit from the systems and methods disclosed herein. Additional materials that can be processed include, but are not limited to, plastics, PCB-contaminated soil, polycyclic aromatic hydrocarbon (PAH)-contaminated soil, soil contaminated with petroleum products, oil shale, tar sands, and coal; and hazardous medical waste. Exposure to electromagnetic wave energy as described herein also provides a method for destruction of organic compounds, such as explosives, munitions, and organic contaminants/pathogens (e.g., anthrax spores).

With respect to the scrap tire disposal and recycling markets, there are currently over 500 million tires in scrap yards and approximately 300 million scrap tires are produced each year. Recycling of scrap tires may provide users with the initial components of fuel, carbon black, steel, etc. These recyclable by-products can be sold as raw materials or used for energy generation.

The systems and methods disclosed herein may be used for reduction of organic materials and polymers to environmentally-friendly by-products which can be sold or residual waste products that can be disposed of safely. For example, the various embodiments of systems and methods disclosed herein include a recycling system that may use microwaves to reduce tires and other materials to their constituent components, a recycling system that recovers carbon black from tires and other materials, a recycling system that recovers petroleum products from tires and other materials, and a recycling system that recovers steel from tires and other materials. Widespread application of the systems and methods disclosed herein may help reduce a country's dependence on non-domestic energy sources. Society will always have a need to dispose of its waste stream, including scrap tires.

In one embodiment, a system may include a sealed vessel that may be supplied with microwave energy from one or more magnetrons via one or more waveguides. An inert purge gas, such as nitrogen or argon, may be pumped into the vessel to reduce the possibility of combustion during operation. A material to be recycled, such as crumb rubber from tires, may be placed in the vessel and subjected to the microwave energy. The resulting hydrocarbon vapor may be exhausted during operation through a heat exchanger and condenser to convert the vapor to liquid oil for use as fuel or other applications. Other vapors may be routed through a scrubber in preparation for use as a gaseous fuel. Effluent from the scrubber may be rendered harmless in processing and may be disposed of via a sewer or other convenient means. Solid material remaining in the vessel may include carbon/carbon black and steel from the crumb rubber. These materials can be sold and reused.

In another embodiment, a material reduction system may include a microwave generator assembly, a first waveguide attached to the microwave generator assembly; a bifurcated wave guide assembly attached to the first waveguide; a quartz pressure window attached across each end of the bifurcated waveguide farthest from the microwave generator assembly; a microwave applicator vessel assembly attached to the bifurcated waveguide assembly, an inert gas source, a heat-exchanger/condenser assembly, a vapor scrubber, a liquid recovery system, a cooling water source, a GC/mass spectrometer (MS), a computer and data storage system, and an electrical power source. The microwave generator assembly may include a launcher, an arc detection system, a directional coupler, a water load, and a circulator. The applicator vessel assembly may include a gas plenum attached to a wall of the applicator vessel assembly, a flexible duct attached to a wall of the applicator vessel assembly, a gas valve attached to a wall of the applicator vessel assembly, and a pressure switch and sensor attached in the applicator vessel.

In the embodiment being described, the inert gas source may be attached to the gas valve of the applicator vessel assembly. The heat-exchanger/condenser assembly may be attached to the applicator vessel assembly via the flexible duct of the applicator vessel assembly. The condenser assembly may include a cooling water circuit, a process gas inlet for receiving gas via the flexible duct, a gas outlet, and a liquid outlet. The vapor scrubber may be attached to the gas outlet of the heat exchanger/condenser. The liquid recovery system may be attached to the liquid outlet of the heat exchanger. The cooling water source may be attached to the condenser, water load, circulator, and cooling water pumps. The cooling water source may include a chiller to control temperatures of the water supplied for cooling. The cooling water source may also include a liquid nitrogen cooling system to control temperatures of the water supplied for cooling, particularly water supplied to the microwave generator assembly. The GC/MS may be attached to both entry and exit to condenser. The computer and data storage system may be attached to the GC/MS and the microwave generator assembly.

With reference to FIG. 1, an exemplary embodiment of a material recovery system 10 may include a housing 12 with a reduction zone 14, an inert gas inlet 16, and a reduction outlet 18. The material recovery system 10 may also include an inert gas supply 20, an electromagnetic wave generator 22, a waveguide assembly 24, and a controller 25. A gaseous exhaust 26 may be exhausted from the reduction zone 14 via the reduction outlet 18 during operation.

The housing 12 may receive an organic source (e.g., a material, such as crumb rubber from tires) in the reduction zone 14. The inert gas inlet 16 and reduction outlet 18 of the housing 12 may be in operative communication with the reduction zone 14. A tray or container, for example, may be filled with the organic source and placed in the reduction zone 14 using, for example, a forklift or other types of lift equipment.

The inert gas supply 20 may be in operative communication with the inert gas inlet 16. The inert gas supply 20 may apply a pressurized inert gas (e.g., nitrogen or argon) to the reduction zone 14 to purge any initial gaseous content from the reduction zone 14. A valve may control the application and removal of pressurized inert gas. The valve, for example, may be manual or solenoid-operated. A regulator may control the pressure of pressurized inert gas applied to the reduction zone 14. The regulator, for example, may be adjusted manually or via a servo motor. A flow meter may allow flow of pressurized inert gas to the reduction zone 14 to be monitored. The flow meter, for example, may display information for visual observation or provide a signal indicating flow to a controller. The initial gaseous content of the reduction zone 14 may be exhausted via the reduction outlet 18 during the purging. Purging provides a substantially oxygen-free environment in the reduction zone 14 for operation. After the purging, the inert gas supply 20 may continue to apply the pressurized inert gas to maintain a positive pressure within the reduction zone 14. The inert gas may be exhausted via the reduction outlet 18 during the maintaining of the positive pressure.

The electromagnetic wave generator 22 may be in operative communication with the housing 12. After the initial gaseous content of the reduction zone 14 is purged, the electromagnetic wave generator 22 may apply electromagnetic wave energy to the reduction zone 14 via the waveguide assembly 24. In one embodiment, the waveguide assembly 24 may include at least one portion with a rectangular cross section. In another embodiment, the waveguide assembly 24 may include a bifurcated waveguide assembly 124 (FIG. 12). Other types of waveguide assemblies and other types of waveguide constructions may be implemented in other embodiments of the material reduction system 10. The electromagnetic wave energy, for example, may be at a select ultra-high frequency (UHF) (i.e., 300 to 3,000 MHz), such as 915 MHz or 2,450 MHz. Other UHF frequencies may also be selected for the electromagnetic waves. The electromagnetic wave energy may also be referred to as microwave energy.

When the electromagnetic wave generator 22 subjects the reduction zone 14 to electromagnetic wave energy, the organic source in the reduction zone 14 may be reduced to at least one gaseous organic decomposition product (e.g., a gaseous by-product). The at least one gaseous organic decomposition product may be exhausted with the inert gas via the reduction outlet 18 during the maintaining of the positive pressure. Thus, the gaseous exhaust 26 may include the at least one gaseous organic decomposition product and inert gas.

The controller 25 may be in operative communication with the electromagnetic wave generator 22 to control application and removal of the electromagnetic wave energy to the reduction zone 14. The controller 25 may also permit the power level, frequency, or other parameters of the electromagnetic wave energy to be adjusted. In other embodiments, the controller 25 may also control the inert gas supply 20 for purging and maintaining of the positive pressure within the reduction zone 14. The controller 25 may provide automated control, semi-automated control, manual control, or combinations thereof. Control of the electromagnetic wave energy may be based on monitoring or detecting certain parameters or conditions associated with the housing 12, reduction zone 14, inert gas supply 20, electromagnetic wave generator 22, or waveguide assembly 24 using, for example, any combination of pressure sensors, pressure regulators, flow meters, safety interlocks, power meters, presence sensors, gas leak detectors, electromagnetic wave leak detectors, flue gas analyzers, and fire detection and suppression equipment. For example, the controller 25 may monitor the content of the gaseous exhaust 26 or flow of the pressurized inert gas to the reduction zone 14 in conjunction with application of the electromagnetic wave energy.

Figure 2:
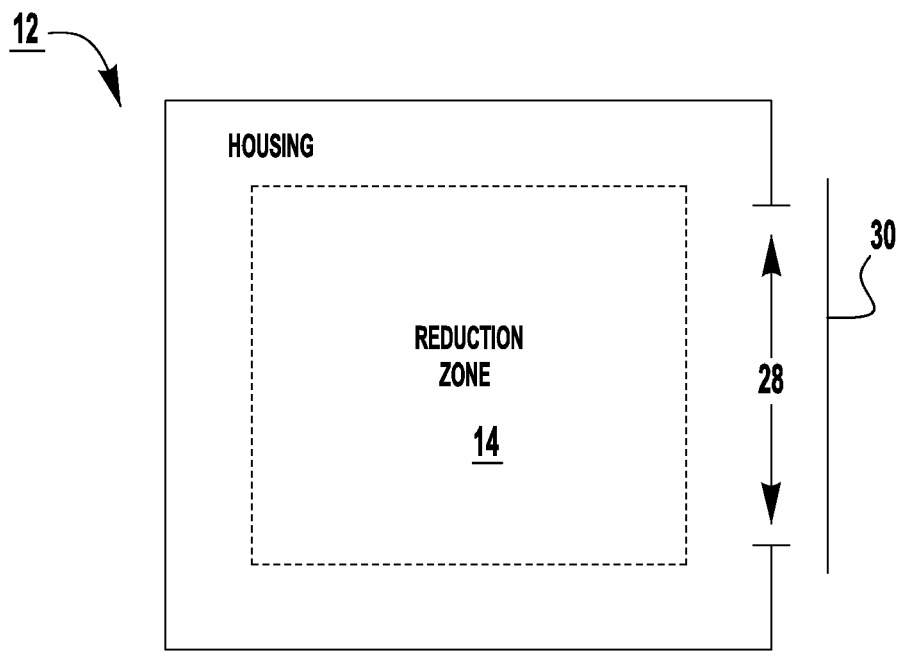
FIG. 2 is a block diagram of an exemplary embodiment of a housing for the material recovery system of FIG. 1.

With reference to FIG. 2, an exemplary embodiment of a housing 12 for the material recovery system 10 (FIG. 1) may also include an access port 28 and a removable cover 30. The access port 28 may be in operative communication with the reduction zone 14 such that the organic source may be placed in the reduction zone 14 when the removable cover 30 is removed. After the organic source is in place, the removable cover 30 may be installed and secured to provide an essentially gas-tight environment in the reduction zone 14 for operation. Any suitable hardware may be used to secure the removable cover 30 to the housing 12. The removable cover 30 may be adapted for transport using lift equipment, such as a forklift, crane, hoist, or similar equipment. Alternatively, the removable cover 30 may include a hinged or tracked door and corresponding hardware.

The organic source in the reduction zone 14 may also be reduced to at least one solid by-product when the electromagnetic wave energy is applied. After the application of electromagnetic wave energy has been stopped, solid by-product(s) may be removed from the reduction zone 14 via the access port 28 by removing the removable cover 30.

The organic source, for example, may be deposited in a tray or another type of container. Solid by-product(s) of the organic source may remain in the container after the application of electromagnetic wave energy has been stopped. The container may be adapted for transport using lift equipment, such as a forklift, crane, hoist, or similar equipment. The access port 28 and removable cover 30 may be configured so that such lift equipment can place the container in the reduction zone 14 and remove the container from the reduction zone 14.

The access port 28 and removable cover 30 may mate together to provide a gas-tight seal and prevent leakage of electromagnetic wave energy. A gasket or similar material may be used between the access port 28 and removable cover 30 to provide suitable mating. Pressure sensors, safety interlocks, gas leak detectors, electromagnetic wave leak detectors, and fire detection and suppression equipment in any combination may be used in conjunction with the controller 25 (FIG. 1) to ensure the removable cover 30 is in place and properly secured during the application of electromagnetic wave energy to the reduction zone 14.

With reference to FIG. 3A, another exemplary embodiment of a housing 12' for the material recovery system 10 (FIG. 1) may also include a lock inlet 32, a first lock zone 34 with a lock gate 36 and a reduction gate 38, a lock outlet 40, and a second lock zone 42 with a reduction gate 44 and a lock gate 48. The first lock zone 34 may be in operative communication with the lock inlet 32 when the lock gate 36 is open and in operative communication with the reduction zone 14 when the reduction gate 38 is open. The controller 25 (FIG. 1), for example, may control the lock gate 36 and reduction gate 38 to sequentially advance organic source from the lock inlet 32 through the lock gate 36 to the first lock zone 34 and from the first lock zone 34 through the reduction gate 38 to the reduction zone 14. Alternatively, the lock gate 36 and reduction gate 38 may be controlled automatically, semi-automatically, or manually independent from the controller 25 (FIG. 1) as the organic source is advanced. The gates, for example, may include hinged, tracked, or expandable doors and corresponding hardware.

The organic source in the reduction zone 14 may also be reduced to at least one solid by-product when the electromagnetic wave energy is applied. The second lock zone 42 may be in operative communication with the reduction zone 14 when the reduction gate 44 is open and in operative communication with the lock outlet 40 when the lock gate 48 is open. The controller 25 (FIG. 1), for example, may control the reduction gate 44 and lock gate 48 to sequentially advance solid by-product(s) from the reduction zone 14 through the reduction gate 44 to the second lock zone 42 and from the second lock zone 42 through the lock gate 48 to the lock outlet 40. Alternatively, the reduction gate 44 and lock gate 48 may be controlled automatically, semi-automatically, or manually independent from the controller 25 (FIG. 1) as solid by-product(s) are advanced.

Lock gate 36 and reduction gate 38 may mate with corresponding hardware associated with the housing 12' such that, when they are closed, a gas-tight seal may be provided for the first lock zone 34. Likewise, reduction gate 44 and lock gate 48 may mate with corresponding hardware associated with the housing 12' such that, when they are closed, a gas-tight seal may be provided for the second lock zone 42. Similarly, reduction gate 38 and reduction gate 44 may mate with corresponding hardware associated with the housing 12' such that, when they are closed, a gas-tight seal may be provided within the reduction zone 14 that also may prevent leakage of electromagnetic wave energy.

The housing 12' may also include inert gas inlets 50, 52 and inert gas outlets 54, 56. The inert gas inlet 50 and inert gas outlet 54 may be configured to receive pressurized inert gas from an inert gas supply 20 for purging the first lock zone 34. Similarly, the inert gas inlet 52 and inert gas outlet 56 may be configured to receive pressurized inert gas from the inert gas supply 20 for purging the second lock zone 42. The inert gas supply 20 may independently purge the first and second lock zones 34, 42. Additionally, the inert gas supply 20 may independently purge the reduction zone 14 as described above in conjunction with FIG. 1. In other embodiments, independent inert gas supplies may be provided in any combination for the first lock zone 34, reduction zone 14, and second lock zone 42.

The first lock zone 34, reduction zone 14, and second lock zone 42 may configured so that the capacity of each zone corresponds to the capacity of an individual batch of organic source. The organic source, for example, may be deposited in a tray or another type of container. Solid by-product(s) of the organic source may remain in the container after the application of electromagnetic wave energy has been stopped. The container may be adapted for transport using lift equipment, such as a forklift, crane, hoist, or similar equipment. The lock inlet 32 and lock gate 36 may be configured so that such lift equipment can place the container in the first lock zone 34. Similarly, the lock outlet 40 and lock gate 48 may be configured so that such lift equipment can remove the container from the second lock zone 42. The housing 12' may include, for example, a containing handling system for moving containers along from the first lock zone 34 to the reduction zone 14 and from the reduction zone 14 to the second lock zone 42. The container handling system may include belts, chains, push rods, guides, hooks, and other types of linkage hardware in any suitable combination.

In other embodiments, the housing 12' may include one or more additional reduction zones 14. For example, if a reduction cycle lasts about an hour and a new batch of organic source can be loaded at least every 15 minutes, it may be desirable for the housing 12' to include four reduction zones 14 so that there is more continuity to overall operation of the system. For this example, batches of organic source may be advanced every 15 minutes through the first lock zone, first reduction zone, second reduction zone, third reduction zone, fourth reduction zone, and second lock zone to provide a semi-continuous process.

In the embodiment being described, a semi-continuous process of advancing batches of organic source may start with the lock gates 36, 48 and reduction gates 38, 44 closed and a positive pressure maintained in the reduction zone 14. The lock gate 36 may be opened and a first container with organic source may be deposited in the first lock zone 34 through the lock inlet 32. With the first container in the first lock zone 34, the lock gate 36 may be closed and the first lock zone 34 may be purged. Next, the reduction gate 38 may be opened and the container handling system may advance the first container to the reduction zone 14. With the first container in the reduction zone 14, the reduction gate 38 may be closed and the first lock zone 34 may be purged.

Next, the lock gate 36 may be opened and a second container with organic source may be deposited in the first lock zone 34. With the second container in the first lock zone 34, the lock gate 36 may be closed and the first lock zone 34 may be purged. Next, once the reduction cycle is complete, the second lock zone may be purged and the reduction gate 44 may be opened. The container handling system may advance the first container to the second lock zone 42. With the first container in the second lock zone 42, the reduction gate 44 may be closed. Next, the reduction gate 38 and the lock gate 48 may be opened. The container handling system may advance the second container to the reduction zone 14.

The first container may be removed from the second lock zone 42 through the lock outlet 40. With the second container in the reduction zone 14, the reduction gate 38 may be closed and the first lock zone 34 may be purged. With the first container removed from the second lock zone 42, the lock gate 48 may be closed. The semi-continuous process may continue to advance containers through the first lock zone 34, reduction zone, 14, and second lock zone 42 in the same fashion.

Pressure sensors, safety interlocks, presence sensors, gas leak detectors, electromagnetic wave leak detectors, flue gas analyzers, and fire detection and suppression equipment in any combination may be used in conjunction with the controller 25 (FIG. 1) to ensure the semi-continuous process is operating properly and that on-going system operations may continue. In other embodiments, belts, conveyors, augers, and gravity fed containers in any suitable combination may used in lieu of the batch containers and container handling system described above to provide a continuous process.

Figure 3B:
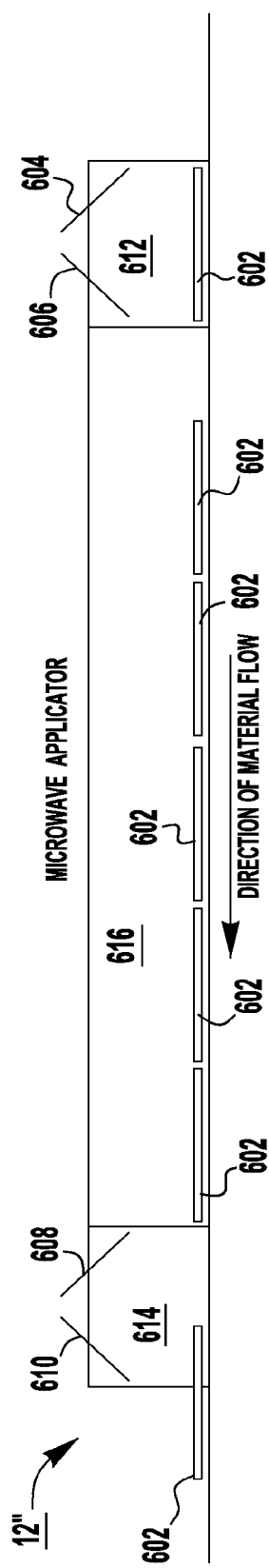
FIG. 3B is a diagram of yet another exemplary embodiment of a housing for the material recovery system of FIG. 1.

With reference to FIG. 3B, another exemplary embodiment of a housing 12" for the material recovery system 10 (FIG. 1) may also include a plurality of material trays 602, an exterior inlet door 604, an interior inlet door 606, an interior outlet door 608, an exterior outlet door 610, a pressure equalization chamber 612, a de-pressurization chamber 614, and an active area 616. The housing 12" may be sized to utilize 500 kW of power or more and may accommodate multiple material handling trays 602 in a single file sequence through the active area 616 (i.e., multi-mode cavity). The inlet and outlet doors 604, 606, 608, 610 may be hydraulically controlled to move between a closed position and an open position.

A material tray 602 may be loaded with subject material and placed in the pressure equalization chamber 612 of the housing 12" via the exterior inlet door 604. For example, an operator may manually move the material tray 602 into position in the pressure equalization chamber 608. Alternatively, a hydraulic ram may be used for staging the material tray 602 and positioning it into the pressure equalization chamber 608. Once the material tray 602 is in position, the exterior inlet door 604 may be closed and the pressure equalization chamber 612 may be is pressurized with nitrogen or another inert gas to the operating pressure for the active area 616. A pressure switch may indicate when pressures in the active area 616 and the pressure equalization chamber 612 are relatively equal.

When the pressures are relatively equal, the interior inlet door 606 may be opened and a hydraulic ram may be used to move the material tray 604 from the pressure equalization chamber 612 into the active area 616. The material tray 602 may be advanced by the hydraulic ram until it engages, for example, a chain drive for advancing material trays 602 through the active area 616 toward the de-pressurization chamber 614. When a material tray 602 reaches the exit of the active area 616, the de-pressurization chamber may be pressurized with nitrogen or another inert gas to the operating pressure of the active area 616. A pressure sensor may indicate when pressures in the active area 616 and the de-pressurization chamber 614 are relatively equal.

When the pressures are relatively equal, the interior outlet door 608 may be opened and a hydraulically-operated extraction arm may engage the material tray 602 and pulls it into the de-pressurization chamber 614. The interior outlet door 608 may be closed and, after suitable delay, the exterior outlet door 610 may be opened for removal of the material tray 602. The material tray 602 may be removed manually or in some suitable automated fashion.

Sequencing of inlet and outlet doors 604, 606, 608, 610 may be coordinated such that the active area 616 is not de-pressurized to outside atmosphere and electromagnetic wave energy does not escape into the surrounding facility. The pressure equalization and de-pressurization chambers 612, 614 may be exposed to microwave energy for a minimal amount with the chambers 612, 614 are pressurized and the corresponding exterior doors 606, 608 are closed. Electromagnetic wave power density within the housing 12" can be increased as the material tray 602 moves through the active area 616. This may increase the efficiency of the material recovery system 10 (FIG. 1).

With reference to FIGS. 4 and 1, another exemplary embodiment of a material recovery system 10 may also include a separator 62. The organic source in the reduction zone 14 may also be reduced to at least one solid by-product 60 when the electromagnetic wave energy is applied. Solid by-products, for example, may include at least one of carbon black and steel. The separator 62 may be in operative communication with the reduction zone 14 to receive solid by-product(s) 60. Solid by-products 60 may be separated into a first solid by-product 64 and at least a second solid by-product 66 by the separator 62. The separator 62 may utilize any combination of technologies suitable for separation of solid by-products, including magnetism to separate magnetic by-products from those that are nonmagnetic, water or another liquid to separate by-products that float from those that sink, and screens or filters to separate by-products based on particle size.

Organic source, for example, may be deposited in a tray or another type of container, placed in the reduction zone 14, and subjected to electromagnetic wave energy. Solid by-product(s) of the organic source may remain in the container after the application of electromagnetic wave energy has been stopped. The container may be adapted for transport using lift equipment, such as a forklift, crane, hoist, or similar equipment. The housing 12 and reduction zone 14 may be configured so that such lift equipment can remove the container from the reduction zone 14.

With reference to FIGS. 5 and 1, yet another exemplary embodiment of a material recovery system 10 may also include a condenser 68 and a separator 70. The condenser 68 may be in operative communication with the reduction outlet 18 to receive gaseous exhaust 26. The gaseous exhaust 26 may be condensed by the condenser 68 to form at least one liquid by-product 72 and a residual gaseous by-product 74. Liquid by-products, for example, may include at least one of diesel fuel no. 2, diesel fuel no. 4, and heating oil. The separator 70 may be in operative communication with the condenser 68 to receive liquid by-product(s) 72 and the residual gaseous by-product 74. The liquid by-product(s) 72 may be separated from the residual gaseous by-product 74 by the separator 70. Pressure sensors, flow meters, safety interlocks, gas leak detectors, electromagnetic wave leak detectors, flue gas analyzers, and fire detection and suppression equipment in any combination may be used in conjunction with the controller 25 to ensure the condenser 68 and separator 70 are operating properly and that on-going system operations may continue.

With reference to FIG. 6, an exemplary embodiment of a separator 70 (FIG. 5) may include a distillation subsystem 76. The distillation subsystem 76 may be in operative communication with the condenser 68 (FIG. 5) to receive liquid by-product(s) 72. The liquid by-product(s) 72 may be distilled by the distillation subsystem 76 into at least one of synthetic crude oil 78, heavy gas oil 80, lubricating oil 82, diesel distillate 84, kerosene 86, gasoline 88, and naphtha 90. Pressure sensors, flow meters, safety interlocks, gas leak detectors, flue gas analyzers, and fire detection and suppression equipment in any combination may be used in conjunction with the controller 25 (FIG. 1) to ensure the distillation subsystem 76 is operating properly and that on-going system operations may continue.

With reference to FIG. 7 and FIG. 5, still yet another exemplary embodiment of a material recovery system 10 (FIG. 1) may also include a scrubber 92. The scrubber 92 may be in operative communication with the separator 70 (FIG. 5) to receive the residual gaseous by-product 74. The residual gaseous by-product 74 may be processed (e.g., scrubbed) by the scrubber 92 to form at least one fuel gas by-product 94 and a residual waste product 96. Fuel gas by-product(s) 94, for example, may include at least one of methane gas, ethane gas, and butane gas. Pressure sensors, flow meters, safety interlocks, gas leak detectors, flue gas analyzers, and fire detection and suppression equipment in any combination may be used in conjunction with the controller 25 (FIG. 1) to ensure the scrubber 92 is operating properly and that on-going system operations may continue.

With reference to FIG. 8, an exemplary embodiment of a scrubber 92 (FIG. 7) may include a scrubbing subsystem 97 and a distillation subsystem 98. The scrubbing subsystem 97 may be in operative communication with the separator 70 (FIG. 5) to receive the residual gaseous by-product 74. The residual gaseous by-product 74 may be processed (e.g., scrubbed) by the scrubbing subsystem 97 to remove select undesirable content from the residual gaseous by-product 74 to form the at least one fuel gas by-product 94 and the residual waste product 96. The distillation subsystem 98 may be in operative communication with the scrubbing subsystem 97 to receive fuel gas by-product(s) 94. The fuel gas by-product(s) 94 may be distilled by the distillation subsystem 98 into at least one of methane gas 100, ethane gas 102, propane gas 104, butane gas 106, pentane gas 108, hexane gas 110, and any corresponding isomer gas 111 (e.g., isobutane). Pressure sensors, flow meters, safety interlocks, gas leak detectors, flue gas analyzers, and fire detection and suppression equipment in any combination may be used in conjunction with the controller 25 (FIG. 1) to ensure the scrubbing subsystem 97 and distillation subsystem 98 are operating properly and that on-going system operations may continue.

With reference to FIGS. 9 and 1, yet another exemplary embodiment of a material recovery system 10 may also include a separator 112. The separator 112 may reduce a source substance 113 into smaller particles using at least one of a grinding process, a crushing process, and a shredding process. The smaller particles may be separated by the separator 112 into a first particle type 114 and at least a second particle type 115. For example, the first particle type may include crumb rubber and the second particle type may include steel. The separator 62 may utilize any combination of technologies suitable for separation of solid by-products, including magnetism to separate magnetic by-products from those that are nonmagnetic, water or another liquid to separate by-products that float from those that sink, and screens or filters to separate by-products based on particle size.

The separator 112 may be in operative communication with the reduction zone 14 to provide smaller particles of the first particle type 114 to the reduction zone 14 as the organic source to which electromagnetic wave energy is applied. A tray or container, for example, may be filled with the organic source and placed in the reduction zone 14 using, for example, a forklift or other types of lift equipment.

With reference to FIGS. 10 and 1, still yet another exemplary embodiment of a material recovery system 10 may also include a scrubber 116. The scrubber 116 may be in operative communication with the reduction outlet 18 to receive gaseous exhaust 26. The gaseous exhaust 26 may be processed (e.g., scrubbed) by the scrubber 116 to form a residual gaseous mixture 117 and a residual waste product 118. Pressure sensors, flow meters, safety interlocks, gas leak detectors, electromagnetic wave leak detectors, flue gas analyzers, and fire detection and suppression equipment in any combination may be used in conjunction with the controller 25 to ensure the scrubber 116 is operating properly and that on-going system operations may continue.

With reference to FIGS. 11 and 10, another exemplary embodiment of a material recovery system 10 (FIG. 1) may also include a condenser 120 and a separator 121. The condenser 120 may be in operative communication with the scrubber 116 to receive the residual gaseous mixture 119. The residual gaseous mixture 119 may be condensed by the condenser 120 to form at least one liquid by-product 122 and a residual gaseous by-product 123. The separator 121 may be in operative communication with the condenser 120 to receive liquid by-product(s) 122 and the residual gaseous by-product 123. The liquid by-product(s) 122 may be separated from the residual gaseous by-product 123 by the separator 121. Liquid by-product(s) 122 may be processed by a distillation subsystem 76 (FIG. 6) as described above. The residual gaseous by-product 123 may be processed by a scrubber 92 (FIG. 7) as described above. Pressure sensors, flow meters, safety interlocks, gas leak detectors, flue gas analyzers, and fire detection and suppression equipment in any combination may be used in conjunction with the controller 25 (FIG. 1) to ensure the condenser 120 and separator 121 are operating properly and that on-going system operations may continue.

With reference to FIG. 12, an exemplary embodiment of a waveguide assembly 124 may allow the electromagnetic wave generator 22 of an exemplary material recovery system 10 (FIG. 1) to subject the reduction zone 14 (FIG. 1) in the housing 12 to electromagnetic wave energy. The housing 12 may include a sealed vessel forming the reduction zone 14 (FIG. 1) which may be supplied with electromagnetic wave energy from one or more magnetrons within the electromagnetic wave generator 22 via the waveguide assembly 124. The waveguide assembly 124 may include a first waveguide 126, a directional coupler 128, a second waveguide 130, a bifurcated waveguide 132, quartz pressure windows 134, 136, a circulator 138, and a water load 140.

The electromagnetic wave generator 22 may provide electromagnetic wave energy to the directional coupler 128 via the first waveguide 126. The directional coupler 128 may insure proper forward "flow" of electromagnetic wave energy to the reduction zone 14 (FIG. 1) while preventing excessive energy from returning to the electromagnetic wave generator 22 and damaging the magnetron. The electromagnetic wave energy continues from the directional coupler 128 to the reduction zone 14 (FIG. 1) via the second waveguide 130 and the bifurcated waveguide 132.

The bifurcated waveguide 132 splits the electromagnetic wave energy into two separate paths prior to introduction into the applicator cavity (i.e., reduction zone 14 (FIG. 1)). The bifurcated waveguide 132 causes the electromagnetic energy to be introduced as two sources that are 90 degrees out of phase with one another. This results in mode stirring inside the reduction zone 14 (FIG. 1). The mode stirring may provide more even distribution and penetration of the electromagnetic wave energy into the subject material to be processed.

The quartz pressure windows 134, 136 may be installed at points where the bifurcated waveguide 132 connects to the housing 12. These quartz pressure windows 134, 136 may allow the electromagnetic wave energy to enter the reduction zone 14 (FIG. 1) but may prevent gases developed during the reduction cycle from being exhausted through the waveguide assembly 124 and possibly damaging the electromagnetic wave generator 22, for example, by causing corrosion or an explosion.

The directional coupler 128 may route reflected electromagnetic wave energy coming back through the second waveguide 130 to the circulator 138, The circulator 138 may shunt reflected electromagnetic wave energy to the water load 140 where it is absorbed by a water reservoir. This prevents reflected electromagnetic wave energy from returning to magnetron(s) in the electromagnetic wave generator 22 where it could potentially cause shortened equipment life or catastrophic failure.

With reference to FIG. 13, another exemplary embodiment of a material recovery system 150 may include a microwave applicator 152 (i.e., a sealed vessel) that may be supplied with an inert gas from a purge gas source 154 and microwave energy from one or more magnetrons within a microwave generator 156 via one or more waveguides 158. The material recovery system 150 may also include an electrical power distribution system 160, a first cooling water distribution system 162, a crumb rubber source 164, a reduced gaseous outlet 166, a reduced solids outlet 168, a solid by-product process subsystem 170, a carbon black product 172, a heat exchanger (i.e., condenser) 174, a second cooling water distribution system 176, an oil recovery process subsystem 178, a fuel oil product 180, a vapor scrubber 182, a fuel gas product 184, a scrubber effluent outlet 186, and a residual waste product 188.

The microwave applicator 152 may include a double-walled housing constructed with 6000 series ⅜ inch aluminum or stainless steel (e.g., Type 316) plate for the inner wall and 6000 series ⅛ inch aluminum or stainless steel (e.g., Type 316) plate for the outer wall with two inches of mineral wool refractory as insulation between the walls. The microwave applicator 152 may withstand operating temperatures in excess of 350 degrees C. and surge pressures in excess of 200 psig even though standard operating pressure may range from 15 to 30 psig.

A double-walled insulated door of the same construction as the housing may provide access to an active cavity where a removable tray of subject material (e.g., crumb rubber from the crumb rubber source 164) may be placed. The door may include a ⅜ inch flange and may be secured in place with cap screws arranged about 4 inches apart near the perimeter of the door to insure conductivity and continuity with the applicator cavity. An ⅛ inch mill paper may be used as gasket material under the door flange to provide a vapor seal. Inert gas (e.g., nitrogen gas) may be introduced to the cavity to reduce the oxygen content to near zero percent to eliminate the potential for fire or explosion. Alternate embodiments may use a "continuous batch" process with vapor locked transition sections for ingress and egress of process material as opposed to the flanged door access.

The microwave applicator 152 may include a gas plenum for collection of process gas derived from reduction (or destruction) of the subject material. An entry to the plenum from the applicator cavity may be separated by a perforated screen (e.g., 50% permeability) that may act as a barrier to prevent electromagnetic wave energy from being introduced into the gas transport system (i.e., reduced gaseous outlet 166). This may reduce or eliminate the risk of arcing inside the plenum. A pressure switch or pressure sensor may be located near an exit point of the plenum for monitoring of cavity pressure. A 4 to 20 mA signal from the sensor may be used by a controller 25 (FIG. 1), such as a programmable logic controller (PLC), to detect when a high pressure limit is exceeded and otherwise to confirm that on-going operations may continue. The microwave applicator 152 may also incorporate various features of housings (e.g., FIG. 1, 12), reduction zones (e.g., FIG. 1, 14), and microwave applicators described above in any suitable combination.

The purge gas source 154 may provide nitrogen, argon, or another inert gas to purge the cavity prior to initialization of the material reduction (or destruction) process. This inert gas may also be used as a carrier for the reduced gases exiting the microwave applicator 152. Applicator cavity pressure may be maintained higher than atmospheric pressure (e.g., 15 to 30 psig) during the reduction cycle. A gas valve may be located near where the inert gas is introduced into the applicator cavity. A flow meter may be located between this valve and the purge gas source 154 to monitor gas flow and volume. For example, purge gas may be supplied at between 8 and 12 cfm. The purge gas source 154 may incorporate various features of inert gas supplies (e.g., FIG. 1, 20) described above in any suitable combination.

The microwave generator 156, for example, may include a commercially available microwave generator, such as a microwave generator from Microdry, Inc. of Crestwood, Ky. or a suitable alternative from any vendor. The microwave generator 156 may also include a commercially available PLC, such as a Model No. SLC-5/03 PLC, Part No. 1747-L531, from Allen Bradley of Milwaukee, Wis. or a suitable alternative from any vendor. Microwave generation may be controlled by the PLC to insure safe and orderly starting and stopping of microwave energy. Additionally, the microwave generator 156 may include one or more 75 kW or 100 kW magnetrons as the source for the microwave energy. Each magnetron may include launcher and arc detection. The microwave generator 156 may incorporate various features of electromagnetic wave generators (e.g., FIG. 1, 22) described above in any suitable combination.

The waveguides 158 may include one or more WR975 waveguides to conduct microwave energy from the magnetron(s) to the microwave applicator 152. The waveguides 158 may form a bifurcated waveguide that splits the microwave energy into two paths prior to introduction into the applicator cavity. The bifurcation may cause two energy sources to enter the cavity at 90 degrees out of phase with one another and may result in mode stirring inside the microwave applicator 152. The mode stirring may provide more even distribution and penetration of the microwave energy into the subject material.

The waveguides 158 may incorporate various features of waveguide assemblies (e.g., FIG. 1, 24; FIG. 12, 124) described above in any suitable combination.

The electrical power distribution system 160 may distribute main power from a 480 volt, three phase distribution panel with a main circuit breaker and sub-feed breakers for the microwave generator 156, lighting panel, and cooling water and scrubber water pump. The lighting panel may distribute 120/240 volt, single phase power to water pumps for cooling the heat exchanger 174 and microwave generator 156, lighting, heat, and peripheral equipment.

A first cooling water distribution system 162 may include a closed system for cooling the microwave generator 156 that may be supplied from a 1,500 gallon poly tank. The cooling water may originate from and return to this reservoir. The first cooling water distribution system 162 may include an 8 gpm pump that provides cooling water at nominal 25 psig to a heat exchanger in the microwave generator 156 via ¾ inch supply line. The cooling water may be provided at a temperature of between 55 to 70 degrees F. Water may circulate through the heat exchanger and exit via ½" supply line to a water load 140 (FIG. 12) in the waveguides 158.

The reduced gaseous outlet 166 may include an aluminum or stainless steel (e.g., Type 316) flexible duct (e.g., 3 inch) that provides process gas (e.g., hydrocarbon vapor) to an input at the heat exchanger 174. The process gas may be carried through the heat exchanger 174 with the inert carrier gas for cooling and condensation. The heat exchanger 174 may include a 20-pass aluminum or stainless steel (e.g., Type 316) heat exchanger that may collect condensable products from the process gas stream. Process gas at 350 degrees C. nominal from the microwave applicator 152 may be cooled to +/−55 degrees C. so that the desired hydrocarbon liquids may be provided to the oil recovery process subsystem 178. Additional condensation may be accomplished through a circular "still" configuration as a second stage heat exchanger (i.e., condenser). This second stage may also be water-cooled to recover more of the desired hydrocarbon liquids. At liquid oil outlet of the condenser, a collection reservoir may be placed to retain or store the condensed liquid. A gaseous outlet of the heat exchanger 174 may be connected to a second aluminum or stainless steel (e.g., Type 316) flexible duct for introduction of the uncondensed process gas into the vapor scrubber 182 for removal of undesirable products. The heat exchanger 174 may incorporate various features of condensers (e.g., FIG. 5, 68; FIG. 11, 120) and separators (e.g., FIG. 5, 70; FIG. 11, 121) described above in any suitable combination.

A second cooling water distribution system 176 may include a closed system for cooling the process gas in the heat exchanger 174 that may be supplied from a 1,500 gallon poly tank. The cooling water may originate from and return to this reservoir. The second cooling water distribution system 176 may include a 15 gpm pump that provides cooling water at a nominal 20 psig to the heat exchanger 174 via a 1½ inch supply line. The cooling water may be provided at a temperature of between 55 to 70 degrees F. After circulating through the heat exchanger 176, the cooling water may be returned to the system water reservoir.

The oil recovery process subsystem 178 may include a collection reservoir that collects condensed liquids from an outlet of the heat exchanger 174. The oil recovery process subsystem 178 may provide the desired condensable hydrocarbons (e.g., fuel oil product 180) to an appropriate container for collection.

The vapor scrubber 182 may remove nitrogen oxides and sulfur dioxides from the process gas stream to insure volatile organic compound (VOC) emissions are below permissible levels. The vapor scrubber 182 may include a commercially available scrubber, such as a vertical packed tower scrubber, Model No. SPT 8-60 from Ceilcote Air Pollution Control of Strongsville, Ohio or a suitable alternative from any vendor. The vapor scrubber 182 may connect to a water supply that provides water at 5 gpm and 40 psig. The supplied water may be sprayed in a packed column and undesirable compounds may be collected in a sump tank. The contents of the sump tank may be disposed of per existing environmental standards as the residual waste product 188. The fuel gas product 184 remaining after scrubbing may either be flared or used by a turbine for electrical power generation. The vapor scrubber 182 may incorporate various features of scrubbers (e.g., FIG. 7, 92; FIG. 10, 116) described above in any suitable combination.

The material recovery system 150 may also include a computer system. The computer system may be used for control of the microwave generator 156 during the reduction (or destruction) process. For example, the computer system may control the PLC within the microwave generator 156 with respect to microwave power levels, process times, and permissible limits of all process parameters. The computer system may also collect and log process data, including alarms and safety conditions. The computer system may include a display for visualization of the process and may allow an operator to monitor critical settings and alarm conditions. The computer system may also include a supervisory control and data acquisition (SCADA) system. The computer system may incorporate various features of controllers (e.g., FIG. 1, 25), PLCs, and computer systems described above in any suitable combination.

With reference to FIG. 14, still another exemplary embodiment of a material recovery system 200 may include a microwave applicator 202 (i.e., a sealed vessel) that may be supplied with an inert gas from a purge gas source 204 and microwave energy from one or more magnetrons within a microwave generator panel 206 via a waveguide assembly 208. The material recovery system 200 may also include an electrical power generator 210, a cooling/scrubber water distribution system 212, a reduced gaseous outlet 214, a GC/MS 215, a condenser 216, a filter press 218, a petroleum distillate storage container 220, a fuel gas outlet 222, a liquid scrubber 224, and an effluent water storage container 226.

The microwave applicator 202 may incorporate various features of housings (e.g., FIG. 1, 12), reduction zones (e.g., FIG. 1, 14), and microwave applicators (e.g., FIG. 13, 152) described above in any suitable combination. The purge gas source 204 may incorporate various features of inert gas supplies (e.g., FIG. 1, 20) and purge gas sources (e.g., FIG. 13, 154) described above in any suitable combination. The microwave generator panel 206 may incorporate various features of electromagnetic wave generators (e.g., FIG. 1, 22) and microwave generators (e.g., FIG. 13, 156) described above in any suitable combination. The waveguide assembly 208 may incorporate various features of waveguide assemblies (e.g., FIG. 1, 24; FIG. 12, 124) and waveguides (e.g., FIG. 13, 158) described above in any suitable combination.

The electrical power generator 210 may generate and distribute main power (e.g., 480 volt, three phase) with a main circuit breaker and sub-feed breakers for the microwave generator panel 206, lighting panel, and cooling/scrubber water pump. The lighting panel may distribute 120/240 volt, single phase to water pumps for cooling the condenser, lighting, heat and peripheral equipment.

The cooling/scrubber water distribution system 212 may include a 1,500 gallon poly tank for use as a water reservoir. The water distribution system 212 may include a closed subsystem for cooling the microwave generator panel 206 and the process gas in the condenser 216 that may return the cooling water to the reservoir. The water distribution system 212 may include a 28 gpm pump that provides cooling water at a nominal 40 psig to a heat exchanger in the microwave generator panel 206, a water load 140 (FIG. 12) in the waveguide assembly 208, and the condenser 216 via suitable supply lines. The cooling water may be provided at a temperature of between 55 to 70 degrees F. Cooling water may exit the water load and be integrated via a "T" connection to supply additional cooling water to the condenser 216 for additional process gas stream cooling capacity.

The GC/MS 215 may include a 4-port GC with a flame ionization detector (FID) to monitor the reduction (or destruction) of the subject material and to insure that all desired reactions within the cavity (e.g., reduction zone FIG. 1, 14) of the microwave applicator 202 are complete. Process gas may also be monitored at other points in the system (e.g., pre- and post-liquid scrubber 216, pre- and post-condenser 216, etc.) to confirm that desired compounds and gases are present and to confirm removal of undesired compounds and chemicals or reduction of undesired compounds and chemicals to acceptable levels.

The liquid scrubber 224 may remove nitrogen oxides and sulfur dioxides from the process gas stream to insure volatile organic compound (VOC) emissions are below permissible levels. The liquid scrubber 224 may include a commercially available scrubber from Ceilcote Air Pollution Control of Strongsville, Ohio, such as a vertical packed tower scrubber, Model No. SPT 8-60. The water distribution system 212 may also include a scrubber subsystem that supplies water to the liquid scrubber 224 that may be sprayed in a packed column and undesirable compounds may be collected in the effluent water storage container 226. The contents of the effluent water storage container 226 may be disposed of per existing environmental standards as residual waste products. The liquid scrubber 224 may incorporate various features of scrubbers (e.g., FIG. 7, 92; FIG. 10, 116) and vapor scrubbers (e.g., FIG. 13, 182) described above in any suitable combination.

The vapor stream after scrubbing may be provided to the condenser 216 via an aluminum or stainless steel (e.g., Type 316) flexible duct (e.g., 3 inch) as a residual gaseous mixture. The vapor stream may be carried through the condenser 216 with the inert carrier gas for cooling and condensation into liquid oil and residual gaseous by-products. The condenser 216 may include a 20-pass aluminum or stainless steel (e.g., Type 316) heat exchanger that may collect the condensable products from the vapor stream. Process gas at 350 degrees C. nominal from the liquid scrubber 224 may be cooled to +/−55 degrees C. so that the desired hydrocarbon liquids may be provided to the filter press 218. Additional condensation may be accomplished through a circular "still" configuration as a second stage condenser. This second stage may be water cooled to recover more of the desired hydrocarbon liquids. The fuel gas outlet 222 of the condenser 216 may include a second aluminum or stainless steel (e.g., Type 316) flexible duct for passing the uncondensed process gas on for further processing (e.g., distillation), utilization by a turbine for electrical power generation (e.g., electrical power generator 210), or flaring. The condenser 216 may incorporate various features of condensers (e.g., FIG. 5, 68; FIG. 11, 120), separators (e.g., FIG. 5, 70; FIG. 11, 121), and heat exchangers (e.g., FIG. 13, 174) described above in any suitable combination.

At a liquid oil outlet of the condenser 216, filter press 218 may be placed to filter the liquid by-product prior to passing it along to the petroleum distillate storage container 220. The petroleum distillate storage container 220 may serve as a collection reservoir to retain or store the condensed liquid.

The material recovery system 200 may also include a computer system. The computer system may incorporate various features of controllers (e.g., FIG. 1, 25), PLCs, and computer systems described above in any suitable combination.

With reference to FIG. 15, an exemplary embodiment of a process 300 for recovering at least one organic decomposition product from an organic source in an essentially gas-tight reduction zone of a material recovery system is shown. The process 300 may start at 302 where inert gas may be caused to flow through the reduction zone from a reduction inlet to a reduction outlet in such a way that pressure in the reduction zone is maintained above ambient pressure with respect to a local environment for the material recovery system. At 304, electromagnetic wave energy may be applied to the organic source in the reduction zone via a bifurcated waveguide assembly in the substantial absence of oxygen to produce at least one gaseous organic decomposition product in the reduction zone that is exhausted from the reduction zone along with the inert gas through the reduction outlet.

With reference to FIGS. 16 and 15, another exemplary embodiment of a process 300 for recovering at least one organic decomposition product from an organic source may also include opening an access port to the reduction zone (306). At 308, the organic source may be placed in the reduction zone through the access port. Next, the access port may be closed (310) and the process 300 may advance to 302.

With reference to FIGS. 17 and 15, yet another exemplary embodiment of a process 300 for recovering at least one organic decomposition product from an organic source may also include receiving the organic source at a lock inlet of the material recovery system (312). At 314, the organic source may be advanced from the lock inlet through an open lock gate to a lock zone of the material recovery system with an opposing closed reduction gate between the lock zone and the reduction zone. Next, the lock gate may be closed (316). At 318, the reduction gate may be opened. Next, the organic source may be advanced from the lock zone to the reduction zone through the lock gate (320). At this point, the process 300 may advance to 302.

With reference to FIG. 18 and FIG. 15, still another exemplary embodiment of a process 300 for recovering at least one organic decomposition product from an organic source the organic source may also be reduced to at least one solid by-product during the applying in 304. In this embodiment, the process 300 may also include removing solid by-product(s) from the material recovery system (324) after 304. For example, the solid by-product(s) may include at least one of carbon black and steel.

With reference to FIGS. 19 and 18, still yet another exemplary embodiment of a process 300 (FIG. 15) for recovering at least one organic decomposition product from an organic source may also include separating the at least one solid by-product into at least first and second solid by-products (326) after 324.

With reference to FIGS. 20 and 15, another exemplary embodiment of a process 300 for recovering at least one organic decomposition product from an organic source may also include stopping the application of the electromagnetic wave energy to the reduction zone (328) after 304. At 330, application of the inert gas to the reduction zone may be stopped. Next, an access port to the reduction zone may be opened (332). At 333, solid by-product(s) may be removed from the reduction zone through the access port.

With reference to FIGS. 21 and 15, yet another exemplary embodiment of a process 300 for recovering at least one organic decomposition product from an organic source may also include advancing solid by-product(s) from the reduction zone through an open reduction gate to a lock zone of the material recovery system with an opposing closed lock gate between the lock zone and a lock outlet (334) after 304. At 336, the reduction gate may be closed. Next, the lock gate may be opened (338). At 340, solid by-product(s) may be removed from the material recovery system through the lock outlet.

With reference to FIGS. 22 and 15, still another exemplary embodiment of a process for recovering at least one organic decomposition product from an organic source may also include condensing gaseous exhaust from the reduction outlet to form at least one liquid by-product and a residual gaseous by-product (342) after 304. At 344, the liquid by-product(s) may be separated from the residual gaseous by-product. For example, the liquid by-product(s) may include at least one of diesel fuel no. 2, diesel fuel no. 4, and heating oil.

With reference to FIG. 23 and FIG. 22, still yet another exemplary embodiment of a process 300 (FIG. 15) for recovering at least one organic decomposition product from an organic source may also include distilling the liquid by-product(s) into at least one of synthetic crude oil, heavy gas oil, lubricating oil, diesel distillate, kerosene, gasoline, and naphtha (346) after 344.

With reference to FIGS. 24 and 22, another exemplary embodiment of a process 300 (FIG. 15) for recovering at least one organic decomposition product from an organic source may also include scrubbing the residual gaseous by-product to form at least one fuel gas by-product and a residual waste product (348) after 344. For example, the fuel gas by-product(s) may include at least one of methane gas, ethane gas, and butane gas.

With reference to FIGS. 25 and 24, yet another exemplary embodiment of a process 300 (FIG. 15) for recovering at least one organic decomposition product from an organic source may also include distilling the at least one fuel gas by-product into at least one of methane gas, ethane gas, propane gas, butane gas, pentane gas, hexane gas, and any corresponding isomer gas (350) after 348.

With reference to FIGS. 26 and 15, still another exemplary embodiment 300 of a process for recovering at least one organic decomposition product from an organic source may also include reducing a source substance into smaller particles using at least one of a grinding process, a crushing process, and a shredding process (352). At 354, the smaller particles may be separated into a first particle type and at least a second particle type. Next, a select amount of smaller particles of the first particle type may be provided to the reduction zone to serve as the organic source (356). For example, the first particle type may include crumb rubber and the second particle type may include steel. At this point, the process 300 may advance to 302.

With reference to FIGS. 27 and 15, still yet another exemplary embodiment of a process 300 for recovering at least one organic decomposition product from an organic source may also include scrubbing the gaseous exhaust from the reduction outlet to form a residual gaseous mixture and a residual waste product (358) after 304.

With reference to FIGS. 28 and 27, another exemplary embodiment of a process 300 (FIG. 15) for recovering at least one organic decomposition product from an organic source may also include condensing the residual gaseous mixture to form at least one liquid by-product and a residual gaseous by-product (360) after 358. At 362, the liquid by-product(s) may be separated from the residual gaseous by-product.

With reference to FIG. 29, an exemplary embodiment of a process 400 for recovering a by-product from a material is shown. The process 400 may start at 402 where the material may be received in a reduction zone of a system. At 404, an inert gas may be supplied to the reduction zone in a manner that purges the reduction zone and maintains a positive pressure therein with respect to an ambient pressure for the system. Initial gaseous content of the reduction zone may be exhausted via a reduction outlet during the purging. Inert gas may be exhausted via the reduction outlet during the maintaining of the positive pressure. At 406, the reduction zone may be subjected to electromagnetic wave energy via a waveguide assembly to reduce the material to at least one gaseous by-product. Gaseous by-product(s) may be exhausted with the inert gas via the reduction outlet during the maintaining of the positive pressure. The waveguide assembly may include at least one portion with a rectangular cross section.

With reference to FIG. 30, an exemplary embodiment of a process 500 for destructive distillation is shown. The process 500 may start at 502 where a material may be received in a reduction zone of a material recovery system. At 504, an inert gas may be applied to the reduction zone in a manner that purges the reduction zone and maintains a positive pressure therein with respect to an ambient pressure for the material recovery system. Initial gaseous content of the reduction zone may be exhausted via a reduction outlet during the purging. Inert gas may be exhausted via the reduction outlet during the maintaining of the positive pressure. At 506, the material in the reduction zone may be subjected to electromagnetic wave energy via a bifurcated waveguide assembly to reduce the material to at least one gaseous by-product. Gaseous by-product(s) may be exhausted with the inert gas via the reduction outlet during the maintaining of the positive pressure. The waveguide assembly including at least one portion with a rectangular cross section.

While the invention is described herein in conjunction with one or more exemplary embodiments, it is evident that many alternatives, modifications, and variations will be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

What is claimed is:

1. A material recovery system, including:
   a housing adapted to receive an organic source in a reduction zone, the housing including an inert gas inlet and a reduction outlet in operative communication with the reduction zone;
   wherein the inert gas inlet is configured to permit purging of the reduction zone and maintaining of a positive pressure therein, and wherein the reduction outlet is configured to exhaust an initial gaseous content of the reduction zone during the purging, and to exhaust at least some of an inert gas during the maintaining of the positive pressure;
   an electromagnetic wave generator in operative communication with the housing and adapted to apply electromagnetic wave energy to the reduction zone via a bifurcated waveguide assembly to reduce the organic source in the reduction zone to at least one gaseous organic decomposition product, the at least one gaseous organic decomposition product being exhausted with the inert gas via the reduction outlet during the maintaining of the positive pressure; and wherein the reduction zone is configured such that the organic source is stationary in the reduction zone during application of the electromagnetic wave energy.

2. The material recovery system of claim 1, the housing further including: an access port in operative communication with the reduction zone and adapted for placing the organic source in the reduction zone when a removable cover associated with the access port is removed.

3. The material recovery system of claim 1, further including a controller, and wherein the housing further includes: a lock inlet; and a lock zone with a lock gate and a reduction gate, the lock zone being in operative communication with the lock inlet when the lock gate is open and in operative communication with the reduction zone when the reduction gate is open; wherein the controller is adapted to control the lock gate and reduction gate to sequentially advance organic source from the lock inlet through the lock gate to the lock zone and from the lock zone through the reduction gate to the reduction zone.

4. The material recovery system of claim 1 wherein the organic source in the reduction zone is also reduced to at least one solid by-product when the electromagnetic wave energy is applied, the material recovery system further including: a separator in operative communication with the reduction zone to receive the at least one solid by-product and adapted to separate the at least one solid by-product into at least first and second solid by-products.

5. The material recovery system of claim 1 wherein the organic source in the reduction zone is also reduced to at least one solid by-product when the electromagnetic wave energy is applied, the housing further including: an access port in operative communication with the reduction zone and adapted for removing the at least one solid by-product from the reduction zone when a removable cover associated with the access port is removed.

6. The material recovery system of claim 1, further including a controller, wherein the organic source in the reduction zone is also reduced to at least one solid by-product when the electromagnetic wave energy is applied, the housing including: a lock outlet; and a lock zone with a reduction gate and a lock gate, the lock zone being in operative communication with the reduction zone when the reduction gate is open and in operative communication with the lock outlet when the lock gate is open; wherein the controller is adapted to control the reduction gate and lock gate to sequentially advance the at least one solid by-product from the reduction zone through the reduction gate to the lock zone and from the lock zone through the lock gate to the lock outlet.

7. The material recovery system of claim 1, further including: a condenser in operative communication with the reduction outlet and adapted to condense gaseous exhaust from the reduction outlet to form at least one liquid by-product and a residual gaseous by-product; and a separator in operative communication with the condenser and adapted to separate the at least one liquid by-product from the residual gaseous by-product.

8. The material recovery system of claim 7, the separator including: a distillation subsystem in operative communication with the condenser and adapted to distill the at least one liquid by-product into at least one of synthetic crude oil, heavy gas oil, lubricating oil, diesel distillate, kerosene, gasoline, and naphtha.

9. The material recovery system of claim 7, further including: a scrubber in operative communication with the separator and adapted to scrub the residual gaseous by-product to form at least one fuel gas by-product and a residual waste product.

10. The material recovery system of claim 9, the scrubber including: a scrubbing subsystem in operative communication with the separator and adapted to remove select undesirable content from the residual gaseous by-product to form the at least one fuel gas by-product and the residual waste product; and a distillation subsystem in operative communication with the scrubbing subsystem and adapted to distill the at least one fuel gas by-product into at least one of methane gas, ethane gas, propane gas, butane gas, pentane gas, hexane gas, and any corresponding isomer gas.

11. The material recovery system of claim 1, further including: a separator in operative communication with the reduction zone and adapted to reduce a source substance into smaller particles using at least one of a grinding process, a crushing process, and a shredding process and separate the smaller particles into at least first and second particle types; wherein the first particle type may be provided to the reduction zone as the organic source to which electromagnetic wave energy is applied.

12. The material recovery system of claim 1, further including: a scrubber in operative communication with the reduction outlet and adapted to scrub gaseous exhaust from the reduction outlet to form a residual gaseous mixture and a residual waste product.

13. The material recovery system of claim 12, further including: a condenser in operative communication with the scrubber and adapted to condense the residual gaseous mixture from the scrubber to form at least one liquid by-product and a residual gaseous by-product; and a separator in operative communication with the condenser and adapted to separate the at least one liquid by-product from the residual gaseous by-product.

14. A system, including:
a housing adapted to receive a material in a reduction zone, the housing including an inert gas inlet and a reduction outlet, both in operative communication with the reduction zone;
wherein the inert gas inlet is configured to permit purging of the reduction zone and maintaining of a positive pressure therein, and wherein the reduction outlet is configured to exhaust an initial gaseous content of the reduction zone during the purging, and to exhaust at least some of an inert gas during the maintaining of the positive pressure; and
an electromagnetic wave generator in operative communication with the housing and adapted to subject the reduction zone to electromagnetic wave energy via a waveguide assembly to reduce the material to at least one gaseous by-product, the gaseous by-product being exhausted with the inert gas via the reduction outlet during the maintaining of the positive pressure, the waveguide assembly including at least one portion with a rectangular cross section,
wherein the reduction zone is configured such that the material is stationary in the reduction zone during the subjecting the electromagnetic wave energy to the reduction zone.

15. The system of claim 14, the housing further including: an access port in operative communication with the reduction zone and adapted for placing the material in the reduction zone when a removable cover associated with the access port is removed.

16. The system of claim 14, further including a controller, and wherein the housing includes: a lock inlet; and a lock zone with a lock gate and a reduction gate, the lock zone being in operative communication with the lock inlet when the lock gate is open and in operative communication with the reduction zone when the reduction gate is open; wherein the controller is adapted to control the lock gate and reduction gate to sequentially advance organic source from the lock inlet through the lock gate to the lock zone and from the lock zone through the reduction gate to the reduction zone.

17. The system of claim 14 wherein the material in the reduction zone is also reduced to at least one solid by-product when the electromagnetic wave energy is applied, the system further including: a separator in operative communication with the reduction zone to receive the at least one solid by-product and adapted to separate the at least one solid by-product into at least first and second solid by-products.

18. The system of claim 14 wherein the material in the reduction zone is also reduced to at least one solid by-product when the electromagnetic wave energy is applied, the housing further including: an access port in operative communication with the reduction zone and adapted for removing the at least one solid by-product from the reduction zone when a removable cover associated with the access port is removed.

19. The system of claim 14, further including a controller, wherein the material in the reduction zone is also reduced to at least one solid by-product when the electromagnetic wave energy is applied, the housing including: a lock outlet; and a lock zone with a reduction gate and a lock gate, the lock zone being in operative communication with the reduction zone when the reduction gate is open and in operative communication with the lock outlet when the lock gate is open; wherein the controller is adapted to control the reduction gate and lock gate to sequentially advance the at least one solid by-product from the reduction zone through the reduction gate to the lock zone and from the lock zone through the lock gate to the lock outlet.

20. The system of claim 14, further including: a condenser in operative communication with the reduction outlet and adapted to condense gaseous exhaust from the reduction outlet to form at least one liquid by-product and a residual gaseous by-product; and a separator in operative communication with the condenser and adapted to separate the at least one liquid by-product from the residual gaseous by-product.

21. The system of claim 20, the separator including: a distillation subsystem in operative communication with the condenser and adapted to distill the at least one liquid by-product into at least one of synthetic crude oil, heavy gas oil, lubricating oil, diesel distillate, kerosene, gasoline, and naphtha.

22. The system of claim 20, further including: a scrubber in operative communication with the separator and adapted to scrub the residual gaseous by-product to form at least one fuel gas by-product and a residual waste product.

23. The system of claim 22, the scrubber including: a scrubbing subsystem in operative communication with the separator and adapted to remove select undesirable content from the residual gaseous by-product to form the at least one fuel gas by-product and the residual waste product; and a distillation subsystem in operative communication with the scrubbing subsystem and adapted to distill the at least one fuel gas by-product into at least one of methane gas, ethane gas, propane gas, butane gas, pentane gas, hexane gas, and any corresponding isomer gas.

24. The system of claim 22, further including: a condenser in operative communication with the scrubber and adapted to condense the residual gaseous mixture from the scrubber to form at least one liquid by-product and a residual gaseous by-product; and a separator in operative communication with the condenser and adapted to separate the at least one liquid by-product from the residual gaseous by-product.

25. The system of claim 14, further including: a separator in operative communication with the reduction zone and adapted to reduce a source substance into smaller particles using at least one of a grinding process, a crushing process, and a shredding process and separate the smaller particles into at least first and second particle types; wherein the first particle type may be provided to the reduction zone as the organic source to which electromagnetic wave energy is applied.

26. The system of claim 14, further including: a scrubber in operative communication with the reduction outlet and adapted to scrub gaseous exhaust from the reduction outlet to form a residual gaseous mixture and a residual waste product.

27. A system, including:
a housing adapted to receive a material in a reduction zone, the housing including an inert gas inlet and a reduction outlet, both in operative communication with the reduction zone;
wherein the inert gas inlet is configured to permit purging of the reduction zone and supplying of a substantially continuous flow of an inert gas to the reduction zone, and wherein the reduction outlet is configured to exhaust an initial gaseous content of the reduction zone during the purging, and to exhaust at least some of an inert gas during the continuous flow of inert gas; and
an electromagnetic wave generator in operative communication with the housing and adapted to subject the reduction zone to electromagnetic wave energy via a waveguide assembly to reduce the material to at least one gaseous by-product, the gaseous by-product being exhausted with the inert gas via the reduction outlet during the continuous flow of inert gas, the waveguide assembly including at least one portion with a rectangular cross section.

28. The system of claim 27 wherein the continuous flow of the inert gas is configured to maintain a positive pressure in the reduction zone.

29. The system of claim 27 wherein the continuous flow of the inert gas is configured to maintain a pressure of between about 15 psig and about 30 psig in the reduction zone.

30. The system of claim 27 wherein the inert gas is configured to be supplied at a flow rate of between about 8 cfm and about 12 cfm.

31. A system, including:
a housing adapted to receive a material in a reduction zone, the housing including an inert gas inlet and a reduction outlet, both in operative communication with the reduction zone;
wherein the inert gas inlet is configured to permit purging of the reduction zone and maintaining of a positive pressure therein, and the reduction outlet is configured to exhaust an initial gaseous content of the reduction zone during the purging, and to exhaust at least some of an inert gas during the maintaining of the positive pressure; and
an electromagnetic wave generator in operative communication with the housing and adapted to subject the reduction zone to electromagnetic wave energy via a bifurcated waveguide assembly to reduce the material to at least one gaseous by-product, the gaseous by-product being exhausted with the inert gas via the reduction outlet during the maintaining of the positive pressure, the waveguide assembly including at least one portion with a rectangular cross section, wherein the bifurcated waveguide assembly is configured to divide the electromagnetic wave energy into a first electromagnetic wave energy and a second electromagnetic wave energy, and wherein the first electromagnetic wave energy is 90 degrees out of phase with the second electromagnetic wave energy, and wherein the reduction zone is configured such that the material is stationary in the reduction zone during the subjecting the electromagnetic wave energy to the reduction zone.

32. The system of claim 31 wherein the bifurcated waveguide assembly is configured to cause a mode stirring inside the reduction zone.

33. A system, including:

a housing adapted to receive a material in a reduction zone, the housing including:

an inert gas inlet and a reduction outlet, both in operative communication with the reduction zone, an access port having a removable cover, and a container adapted to contain the material, wherein the access port is adapted to permit placement of the container in the reduction zone;

wherein the inert gas inlet is configured to permit purging of the reduction zone and maintaining of a positive pressure therein, and the reduction outlet is configured to exhaust an initial gaseous content of the reduction zone during the purging, and to exhaust at least some of an inert gas during the maintaining of the positive pressure; and an electromagnetic wave generator in operative communication with the housing and adapted to subject the reduction zone to electromagnetic wave energy via a waveguide assembly to reduce the material to at least one gaseous by-product, the gaseous by-product being exhausted with the inert gas via the reduction outlet during the maintaining of the positive pressure, the waveguide assembly including at least one portion with a rectangular cross section.

34. The system of claim 33, wherein the access port is adapted to permit removal of the container from the reduction zone.

* * * * *